US012399702B2

(12) United States Patent
Wang et al.

(10) Patent No.: US 12,399,702 B2
(45) Date of Patent: Aug. 26, 2025

(54) OPERATING SYSTEM UPGRADE METHOD AND DEVICE, STORAGE MEDIUM, AND COMPUTER PROGRAM PRODUCT

(71) Applicant: Honor Device Co., Ltd., Shenzhen (CN)

(72) Inventors: Yanzhao Wang, Shenzhen (CN); Qingtao Hao, Shenzhen (CN); Chao Chen, Shenzhen (CN); Zenghui Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 228 days.

(21) Appl. No.: 18/247,315

(22) PCT Filed: May 20, 2022

(86) PCT No.: PCT/CN2022/094139
§ 371 (c)(1),
(2) Date: Mar. 30, 2023

(87) PCT Pub. No.: WO2023/005370
PCT Pub. Date: Feb. 2, 2023

(65) Prior Publication Data
US 2023/0229424 A1 Jul. 20, 2023

(30) Foreign Application Priority Data
Jul. 30, 2021 (CN) .................. 202110872080.X

(51) Int. Cl.
*G06F 12/00* (2006.01)
*G06F 3/00* (2006.01)
(Continued)

(52) U.S. Cl.
CPC .................... *G06F 8/65* (2013.01)

(58) Field of Classification Search
CPC .................... G06F 8/65; G06F 8/64
See application file for complete search history.

(56) References Cited

U.S. PATENT DOCUMENTS 8,635,425 B1 * 1/2014 Adogla .............. G06F 8/63
714/710
8,924,952 B1 * 12/2014 Hou .................. G06F 8/65
717/172
(Continued)

FOREIGN PATENT DOCUMENTS

| CN | 103176824 A | 6/2013 |
| CN | 105630548 A | 6/2016 |

(Continued)

OTHER PUBLICATIONS

Baumann, A., et al., "Providing Dynamic Update in an Operating System," Conference on Usenix Technical Conference USENIX Association, Dec. 31, 2005, 13 pages.
(Continued)

*Primary Examiner* — S. Sough
*Assistant Examiner* — Mohammad H Kabir
(74) *Attorney, Agent, or Firm* — Conley Rose, P.C.

(57) ABSTRACT

An operating system upgrade method and device, and a storage medium. The method includes: obtaining an operating system upgrade package that includes a second partition table and operating system upgrade data, where address configurations of partitions with a same name are consistent in the second partition table and a first partition table; triggering a first restart of the electronic device; updating a partition table of the electronic device to the second partition table in the recovery mode; triggering a second restart of the electronic device, where after the second restart, the electronic device loads data of a basic partition, a first static partition, and a dynamic partition to run the first operating system; and upgrading an operating system of the electronic (Continued)

device according to the operating system upgrade data, and upgrading the first operating system to a second operating system.

20 Claims, 17 Drawing Sheets

(51) Int. Cl.
*G06F 8/65* (2018.01)
*G06F 9/44* (2018.01)

(56) References Cited

U.S. PATENT DOCUMENTS

| | | | |
|---|---|---|---|
| 2009/0249330 A1* | 10/2009 | Abercrombie | G06F 9/5077 |
| | | | 718/1 |
| 2015/0046749 A1* | 2/2015 | Kumagai | G06F 11/1417 |
| | | | 714/15 |
| 2015/0331692 A1 | 11/2015 | Schekochikhin et al. | |
| 2017/0329593 A1* | 11/2017 | McMullen | G06F 11/1433 |
| 2020/0301737 A1* | 9/2020 | García Martínez | G06F 16/254 |
| 2022/0100490 A1* | 3/2022 | Hwang | G06F 16/168 |
| 2023/0004378 A1* | 1/2023 | Greyer | G06F 9/445 |

FOREIGN PATENT DOCUMENTS

| | | |
|---|---|---|
| CN | 105723462 A | 6/2016 |
| CN | 106293848 A | 1/2017 |
| CN | 106484450 A | 3/2017 |
| CN | 106708543 A | 5/2017 |
| CN | 107643898 A | 1/2018 |
| CN | 107885535 A | 4/2018 |
| CN | 110704090 A | 1/2020 |
| CN | 112783537 A | 5/2021 |

OTHER PUBLICATIONS

Zhang, Y., et al., "A Technical of Support Dynamic Upgrade of Core Levei in Operating System," Aeronautical Computing Technique, vol. 50 No. 4, Jul. 31, 2020, 4 pages.

\* cited by examiner

OPERATING SYSTEM UPGRADE METHOD AND DEVICE, STORAGE MEDIUM, AND COMPUTER PROGRAM PRODUCT

CROSS-REFERENCE TO RELATED APPLICATIONS

This application is a U.S. National Stage of International Application No. PCT/CN2022/094139, filed on May 20, 2022, which claims priority to Chinese Patent Application No. 202110872080.X, filed on Jul. 30, 2021, both of which are incorporated herein by reference in their entireties.

TECHNICAL FIELD

This application relates to the field of computer technologies, and specifically, to an operating system upgrade method and device, a storage medium, and a computer program product.

BACKGROUND

In an application scenario of the prior art, a user terminal needs to install an operating system to be used by a user. For example, a mobile phone operating system (such as an iOS system and an Android system) needs to be installed on a mobile phone to be used by a user.

After a terminal device installs the operating system, when a version of the operating system is upgraded, the operating system installed on the terminal device needs to be upgraded. Generally, a partition architecture of the operating system of the terminal device is planned in advance on a memory of the terminal device. The upgrade of the operating system is mainly to update operating system data in an original operating system partition architecture. However, the partition architecture of the operating system needs to be modified when some relatively large versions are upgraded, for example, adding a partition or deleting a partition. Therefore, there is a need for an operating system upgrade method that supports adjustment of a partition architecture.

SUMMARY

In view of this, this application provides an operating system upgrade method and device, a storage medium, and a computer program product, so as to resolve a problem about how to adjust a partition architecture of a device memory in the prior art.

According to a first aspect, an embodiment of this application provides an operating system upgrade method, applied to an electronic device, where the electronic device includes a processor and a memory, the memory includes a basic partition, a first static partition, a second static partition, a dynamic partition, and a user data partition, a current partition table of the electronic device is a first partition table corresponding to a first operating system, data of the basic partition, the first static partition, and the dynamic partition is loaded after the electronic device is started, so as to run the first operating system, and after the first operating system runs, the method includes:

obtaining an operating system upgrade package, where the operating system upgrade package includes a second partition table corresponding to a second operating system and operating system upgrade data, the operating system upgrade data is used to upgrade the first operating system to the second operating system, and address configurations of partitions with a same name are consistent in the second partition table and the first partition table;

triggering a first restart of the electronic device, where after the first restart, the electronic device enters a recovery mode;

updating the partition table of the electronic device to the second partition table in the recovery mode;

triggering a second restart of the electronic device, where after the second restart, the electronic device loads the data of the basic partition, the first static partition, and the dynamic partition, to run the first operating system; and upgrading the operating system of the electronic device according to the operating system upgrade data, and upgrading the first operating system to the second operating system.

According to the solution of the first aspect of this application, upgrade may be performed on an operating system that uses a virtual A/B upgrade solution, and a partition table of a device memory is updated in an upgrade process. According to the solution of the first aspect of this application, without the need to prepare a burning tool, the device may update the partition table based on the downloaded operating system upgrade package. According to the solution of the first aspect of this application, operation difficulty of updating a device partition table is greatly simplified, and user experience is improved.

In an implementation of the first aspect, before the electronic device is restarted to enter the recovery mode, the method further includes:

performing a partition table update preparation operation, where the partition table update preparation operation is used to configure an execution process of the electronic device in the recovery mode.

In an implementation of the first aspect, the performing a partition table update preparation operation includes:

saving the second partition table to a cache; and writing a first control command into the cache, where the first control command is corresponding to a first operation process, and the first operation process is used to update the partition table of the electronic device to the second partition table.

In an implementation of the first aspect, the first operation process includes:

verifying the second partition table;

after the second partition table is checked successfully, verifying whether address configurations of partitions with a same name are consistent in the second partition table and the first partition table; and updating the partition table of the electronic device by using the second partition table when the address configurations of the partitions with the same name are consistent in the second partition table and the first partition table.

In an implementation of the first aspect, the updating the partition table of the electronic device to the second partition table in the recovery mode includes:

loading the second partition table in the cache and the first control command;

parsing the first control command, and invoking execution code of the first operation process according to the first control command; and executing the execution code of the first operation process.

In an implementation of the first aspect, before the performing a partition table update preparation operation, the method further includes;

determining whether the operating system upgrade package is used to update a partition;

when the operating system upgrade package is used to update a partition, determining whether the partition table of the electronic device is updated based on the second partition table; and when the partition table of the electronic device is not updated based on the second partition table, performing the partition table update preparation operation.

In an implementation of the first aspect, the determining whether the operating system upgrade package is used to update a partition includes:

parsing a description file corresponding to the operating system upgrade package, where when the description file includes a partition upgrade package flag, the operating system upgrade package is used to update a partition.

In an implementation of the first aspect, the determining whether the partition table of the electronic device is updated based on the second partition table includes: determining, according to a status of a partition update flag bit, whether the partition table of the electronic device is updated based on the second partition table, and before the obtaining an operating system upgrade package, the status of the partition update flag bit is not updated;

the updating the partition table of the electronic device to the second partition table in the recovery mode includes: setting the status of the partition update flag bit to updated; and the upgrading the operating system of the electronic device according to the operating system upgrade data, and upgrading the first operating system to the second operating system includes: setting the status of the partition update flag bit to not updated.

In an implementation of the first aspect, before the upgrading the operating system of the electronic device according to the operating system upgrade data, the method further includes:

after the second restart, and after the first operating system runs, re-determining whether the partition table of the electronic device is updated based on the second partition table; and when the first upgrade package obtaining tool determines that the partition table of the electronic device has been updated based on the second partition table, upgrading the operating system of the electronic device according to the operating system upgrade data.

In an implementation of the first aspect, the first operating system includes a first upgrade package obtaining tool and a first update engine, and after the first operating system runs, the method includes:

obtaining, by the first upgrade package obtaining tool, the operating system upgrade package;

determining, by the first upgrade package obtaining tool, whether the operating system upgrade package is used to update a partition;

when the operating system upgrade package is used to update a partition, determining, by the first upgrade package obtaining tool, whether the partition table of the electronic device is updated based on the second partition table;

when the partition table of the electronic device is not updated based on the second partition table, performing, by the first upgrade package obtaining tool, the partition table update preparation operation;

recording, by the first upgrade package obtaining tool, a first upgrade process breakpoint, where the first upgrade process breakpoint is corresponding to the determining whether the partition table of the electronic device is updated based on the second partition table;

triggering, by the first upgrade package obtaining tool, the first restart;

after the first restart, entering, by the electronic device, the recovery mode, where in the recovery mode, the partition table of the electronic device is updated to the second partition table, and then the partition table of the electronic device has been updated based on the second partition table;

triggering the second restart in the recovery mode;

after the second restart, loading, by the electronic device, the data of the basic partition, the first static partition, and the dynamic partition to run the first operating system;

after the first operating system runs, reading, by the first upgrade package obtaining tool, the first upgrade process breakpoint, and re-determining whether the partition table of the electronic device has been updated based on the second partition table; and when the first upgrade package obtaining tool determines that the partition table of the electronic device has been updated based on the second partition table, triggering, by the first upgrade package obtaining tool, the first update engine to upgrade the operating system of the electronic device according to the operating system upgrade data.

In an implementation of the first aspect, the first operating system includes a second upgrade package obtaining tool and a second update engine, and after the first operating system runs, the method includes:

obtaining, by the second upgrade package obtaining tool, the operating system upgrade package;

triggering, by the second upgrade package obtaining tool, the second update engine to enter an upgrade process;

determining, by the second update engine, whether the operating system upgrade package is used to update a partition;

when the operating system upgrade package is used to update a partition, determining, by the second update engine, whether the partition table of the electronic device has been updated based on the second partition table;

when the partition table of the electronic device is not updated based on the second partition table, executing, by the second update engine, the partition table update preparation operation;

returning, by the second update engine, status information indicating that the partition table update preparation operation is completed to the second upgrade package obtaining tool;

recording, by the second upgrade package obtaining tool, a second upgrade process breakpoint, where the second upgrade package obtaining tool corresponding to the second upgrade process breakpoint to trigger the second update engine to enter an upgrade process;

triggering, by the second upgrade package obtaining tool, a third restart of the electronic device;

after the third restart, entering, by the electronic device, the recovery mode, where in the recovery mode, the partition table of the electronic device is updated to the second partition table, and then the partition table of the electronic device has been updated based on the second partition table;

triggering a fourth restart of the electronic device in the recovery mode;

after the fourth restart, loading, by the electronic device, the data of the basic partition, the first static partition, and the dynamic partition to run the first operating system;

after the first operating system runs, reading, by the second upgrade package obtaining tool, the second upgrade process breakpoint, and triggers the second update engine to enter the upgrade process again;

re-determining, by the second update engine, whether the operating system upgrade package is used to update a partition;

when the operating system upgrade package is used to update a partition, re-determining, by the second update engine, whether the partition table of the electronic device has been updated based on the second partition table; and when the partition table of the electronic device is not updated based on the second partition table, upgrading, by the second update engine, the operating system of the electronic device according to the operating system upgrade data.

In an implementation of the first aspect, the operating system upgrade data further includes static partition upgrade data and dynamic partition upgrade data, and the upgrading an operating system of the electronic device according to the operating system upgrade data includes:

upgrading data of the second static partition based on the static partition upgrade data;

creating a virtual dynamic partition in the user data partition, and writing the dynamic partition upgrade data to the virtual dynamic partition;

modifying a start sequence of the electronic device from starting from the first static partition to starting from the second static partition;

triggering a third restart of the electronic device;

after the third restart, loading, by the electronic device, data of the basic partition, the second static partition, the dynamic partition, and the virtual dynamic partition to run the second operating system; and after the second operating system runs, merging the data of the virtual dynamic partition to the dynamic partition.

According to a second aspect, this application provides an electronic device, where the electronic device includes a processor and a memory, the memory includes a basic partition, a first static partition, a second static partition, a dynamic partition, and a user data partition, the dynamic partition includes a plurality of sub-partitions, and the processor is configured to execute software code stored in the memory, so that after the electronic device is started, data of the basic partition, the first static partition, and the dynamic partition is loaded to run a first operating system; and In addition, after the first operating system runs, the electronic device performs the method process in the first aspect.

According to a third aspect, this application provides a computer-readable storage medium storing a computer program, the computer program, when being run on a computer, causing the computer to perform the method according to the first aspect.

According to a fourth aspect, this application provides a computer program product including a computer program, the computer program, when being run on a computer, causing the computer to perform the method according to the first aspect.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To better understand the technical solutions of this application, the embodiments of this application are described below in detail with reference to the accompanying drawings.

It should be clear that the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely for describing specific embodiments, but are not intended to limit this application. The terms "a", "said" and "the" of singular forms used in the embodiments and the appended claims of this application are also intended to include plural forms, unless otherwise specified in the context clearly.

The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

To modify a partition architecture of an operating system, a feasible solution is to exit the operating system, enter a recovery (Recovery) mode, refresh a memory of a device as a whole, reconfigure the partition structure of the device memory, and write an operating system program into a reconfigured partition.

Generally, the partition table is used to describe a partition deployment of a memory in a device, and define a start address and a size of each partition. The partition table is generally stored in a disk header of the memory of the device. When the device starts, each partition on the memory may be located by reading the partition table.

Figure 1:
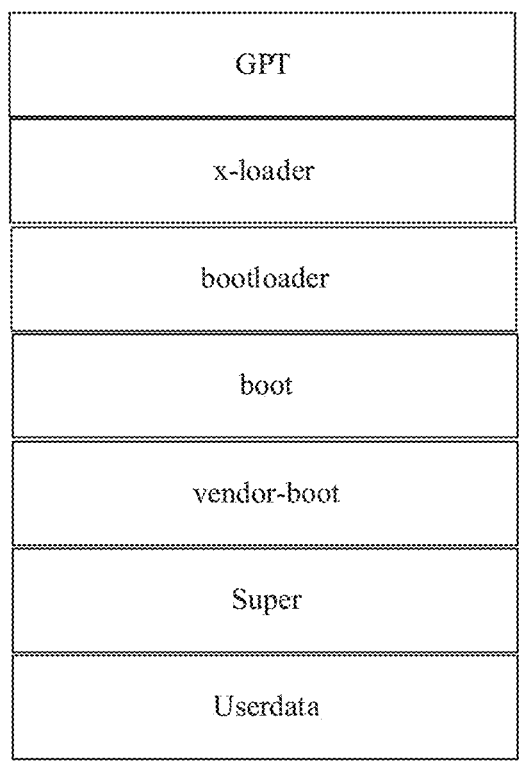
FIG. 1 is a schematic structural diagram of data storage according to an embodiment of this application.

A disk that uses a global unique identity partition table (GUID Partition Table, GPT) is used as an example. FIG. 1 is a schematic structural diagram of data storage according to an embodiment of this application. It is assumed that a partition architecture of an operating system of version 1.0 includes a GPT partition, an x-loader partition, a bootloader partition, a boot partition, a vendor-boot partition, a Super partition, and a Userdata partition. A partition table is stored in the GPT partition. The Userdata is used to store personal data of a user, for example, an APP installed by the user personally, a picture stored by the user personally, a document, and personal data such as a video. The x-loader partition, the bootloader partition, the boot partition, the vendor-boot partition, and the Super partition are used to store operating system data.

The partition table saved in the GPT partition is shown in Table 1.

TABLE 1

| Partition number (partition) | Partition name (name) | Partition size (size) | Partition start address-end address (start address-End address) |
|---|---|---|---|
| 0 | GPT | | 0x00000000-0x000000FF |
| 1 | x-loader | 256 KB | 0x00000100-AD1 |
| 2 | bootloader | 600 KB | AD1 + 1-AD2 |
| 3 | boot | 32 MB | AD2 + 1-AD3 |
| 4 | vendor_boot | 32 MB | AD3 + 1-AD4 |
| 5 | Super | 8 GB | AD4 + 1-AD5 |
| 6 | User data | 128 GB | AD5 + 1-AD6 |

In Table 1, AD1-AD6 respectively represent different address strings. The number string of the address is hexadecimal, and the address string plus 1 represents offset by one memory bit (bit). Each eight memory bits are one byte (Byte), every 1024 bytes are 1 KB, and every 1024 KB is 1 MB. For example:

AD1 is a storage bit of the 0x000000FF offset 256 KB, that is, 0x002000FF.

An address of the x-loader is 0x000000100-0x002000FF, and a size of the 0x00000100-x002000FF is 256 KB.

AD1+1 is x000200FF offset by one storage bit, that is, 0x00200100.

AD2 is a storage bit of AD1 (0x002000FF) offset 600 KB, that is, 0x006B00FF. The address of the bootloader is 0x00200100-0x006B00FF, and the size of the 0x00200100-0x006B00FF is 600 KB.

Figure 2:
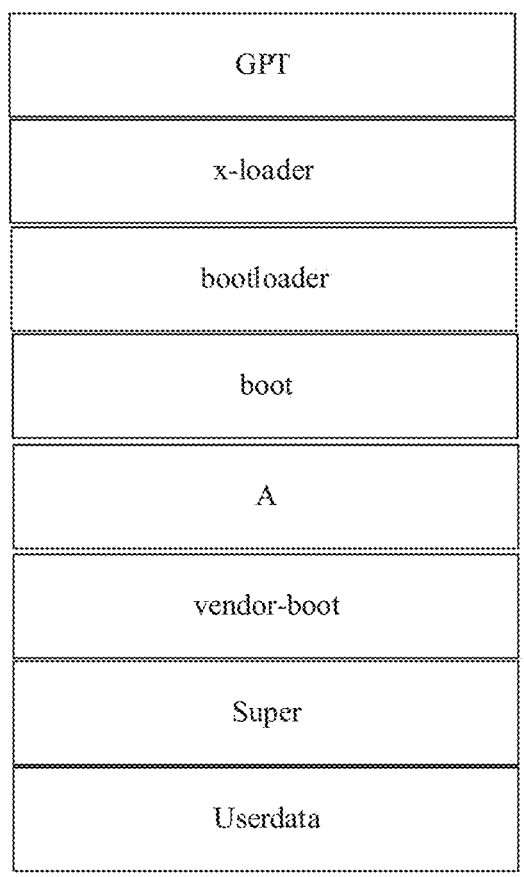
FIG. 2 is a schematic structural diagram of data storage according to an embodiment of this application.

Assume that after the operating system is upgraded to version 2.0, an A partition is added to the partition architecture. FIG. 2 is a schematic structural diagram of data storage according to an embodiment of this application. It is assumed that a partition architecture of an operating system of version 2.0 includes a GPT partition, an xc-loader partition, a bootloader partition, a boot partition, an A partition, a vendor-boot partition, a Super partition, and a Userdata partition.

The partition table saved in the GPT partition is shown in Table 2.

TABLE 2

| Partition number (partition) | Partition name (name) | Partition size (size) | Partition start address-end address (start address-End address) |
|---|---|---|---|
| 0 | GPT | | 0x0000 0000-0x000000FF |
| 1 | x-loader | 256 KB | 0x00000100-AD1 |
| 2 | bootloader | 600 KB | AD1 + 1-AD2 |
| 3 | boot | 32 MB | AD2 + 1-AD3 |
| 4 | A | 32 MB | AD3 + 1-AD21 |
| 5 | vendor_boot | 32 MB | AD21 + 1-AD22 |
| 6 | Super | 8 GB32 MB | AD22 + 1-AD5 |
| 7 | User data | 128 GB-32 MB | AD5 + 1-AD6 |

In Table 2, AD21 and AD22 respectively represent different address strings. AD21 is a storage bit of AD3 offset 32 MB; and AD22 is a storage bit of AD21 offset 32 MB. Compared with the partition structure in Table 1, the size of Super is reduced by 32 MB in the partition structure in Table 2. The partition architecture of the operating system of the version 1.0 is corresponding to the partition architecture shown in FIG. 1, and the partition architecture of the operating system of version 2.0 is corresponding to the partition architecture shown in FIG. 2. The partition architecture shown in FIG. 1 is different from the partition architecture shown in FIG. 2. Therefore, in a process of upgrading an operating system of a device from version 1.0 to version 2.0, a partition architecture of a device memory needs to be first reconfigured from the partition architecture shown in FIG. 1 to the partition architecture shown in FIG. 2. That is, the partition table stored in the GPT is refreshed from Table 1 to Table 2.

It is not difficult to understand that, compared with the partition start address-end address shown in Table 1, in the partition start address-end address shown in Table 2, start address-end addresses of the vendor-boot partition and the Super partition change. Therefore, if the partition table is refreshed from Table 1 to Table 2 (reconfigured partition architecture), data on the vendor-boot partition and the Super partition in the memory is not available. Then, even if the operating system is upgraded from version 1.0 to version 2.0, data in the vendor-boot partition and the Super partition does not change, after the partition table is refreshed from Table 1 to Table 2, the vendor-boot partition and the Super partition in the memory need to be rewritten.

Therefore, for an operating system from 1.0 to 2.0, a feasible upgrade solution is that after a partition table is refreshed, data is rewritten to all operating system data partitions.

Figure 3:
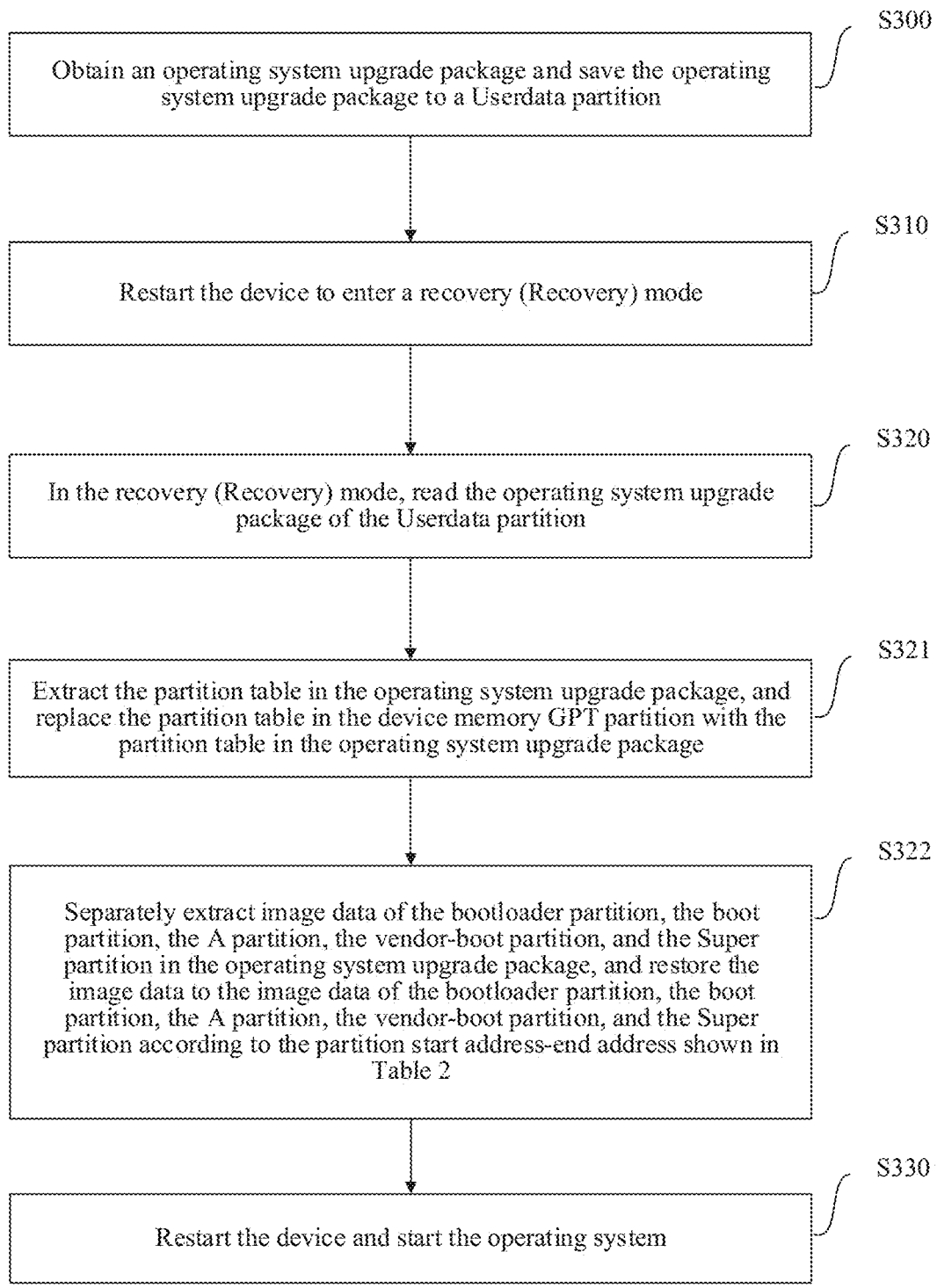
FIG. 3 is a flowchart of upgrading an operating system according to an embodiment of this application.

Specifically, FIG. 3 is a flowchart of upgrading an operating system according to an embodiment of this application. As shown in FIG. 3, the device performs the following process to upgrade the operating system from version 1.0 to version 2.0:

S300. Obtain an operating system upgrade package, and save the operating system upgrade package to a Userdata partition, where the operating system upgrade package includes the partition table shown in Table 2 and image data of the bootloader partition, the boot partition, the A partition, the vendor-boot partition, and the Super partition that are corresponding to the operating system of version 2.0.

S310. Restart the device to enter a recovery (Recovery) mode.

S320. In the recovery (Recovery) mode, read the operating system upgrade package of the Userdata partition.

S321. Extract a partition table in the operating system upgrade package, and replace the partition table in the device memory GPT partition with the partition table in the operating system upgrade package. Before S321, the partition table in the GPT partition is shown in Table 1.

S322. Separately extract image data of the bootloader partition, the boot partition, the A partition, the vendor-boot partition, and the Super partition in the operating system upgrade package, and restore the image data to the image data of the bootloader partition, the boot partition, the A partition, the vendor-boot partition, and the Super partition according to the partition start address-end address shown in Table 2.

S330. Restart the device and start the operating system.

Although adjustment to the operating system partition architecture may be implemented based on the process shown in FIG. 3, as data security requirements continue to improve, in some operating systems, access to user personal data in the recovery (Recovery) mode is prohibited, so that the device in the recovery (Recovery) mode cannot rewrite the operating system data in the partition.

Figure 4:
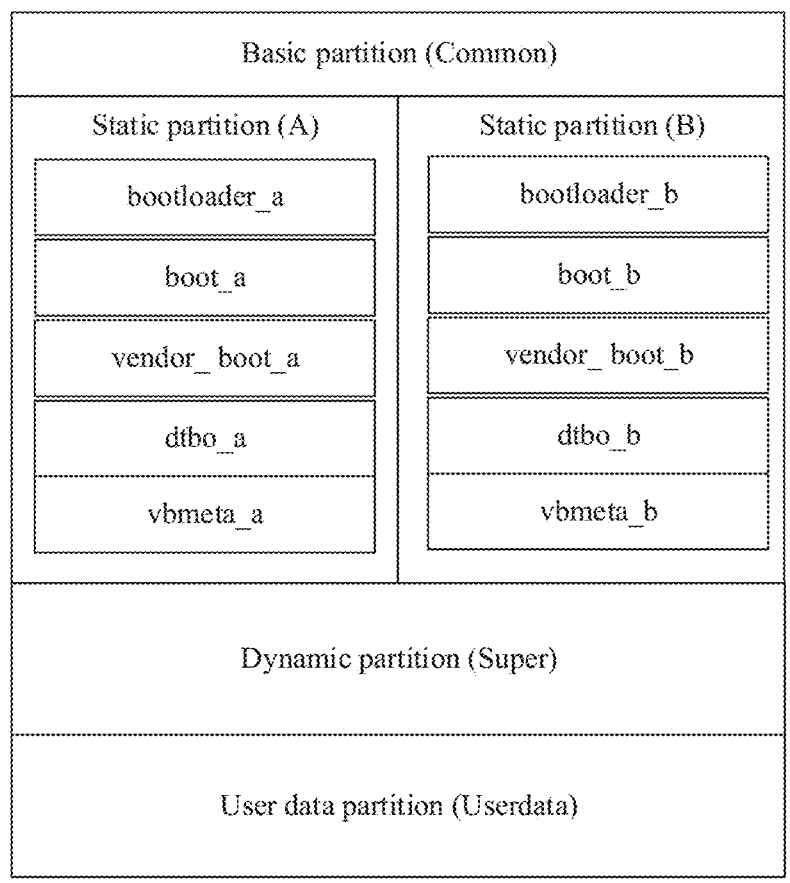
FIG. 4 is a schematic structural diagram of data storage according to an embodiment of this application.

An Android system in a virtual A/B upgrade manner is used as an example. FIG. 4 is a schematic structural diagram of data storage according to an embodiment of this application. As shown in FIG. 4, the Android system data storage area includes a basic partition (Common), a static partition (A), a static partition (B), a dynamic partition (Super), and a user data partition (Userdata).

The user data partition (Userdata) is used to store personal data of a user, for example, an APP installed by the user personally, a picture stored by the user personally, a document, and personal data such as a video. The data stored in the basic part is system data not involved in operating system upgrade. A structure of the static partition (A) corresponds to a structure of the static partition (B), and sub-partition naming is distinguished from each other by using suffixes _a and _b. For example, the static partition (A) includes bootloader_a, boot_a, vendor_boot_a, dtbo_a, vbmeta_a; the static partition (B) includes bootloader_b, boot_b, vendor_boot_b, dtbo_b, and vbmeta_b. The dynamic partition (Super) includes a plurality of sub-partitions (System, system_ext, vendor, product, Cust, Odm).

When the device starts, it starts from a static partition. For example, the device starts from the static partition (A): The basic partition (Common), the static partition (A), and the dynamic partition (Super) are sequentially loaded; the device starts from the static partition (B): The basic partition (Common), the static partition (B), and the dynamic partition (Super) are sequentially loaded.

A universal flash storage (Universal Flash Storage, UFS) in a master boot record (Master Boot Record, MBR) format is used as an example. In the MBR of the UFS (primary boot sector, the first sector of the UFS, that is, cylinder 0 head 0 sector 1 of a C/H/S address), a device start sequence description is stored, for example, starting from the static partition (A) (start sequence flag A) or starting from the static partition (B) (start sequence flag A). After the device is started, read the device start sequence from the MBR of the UFS.

Figure 5:
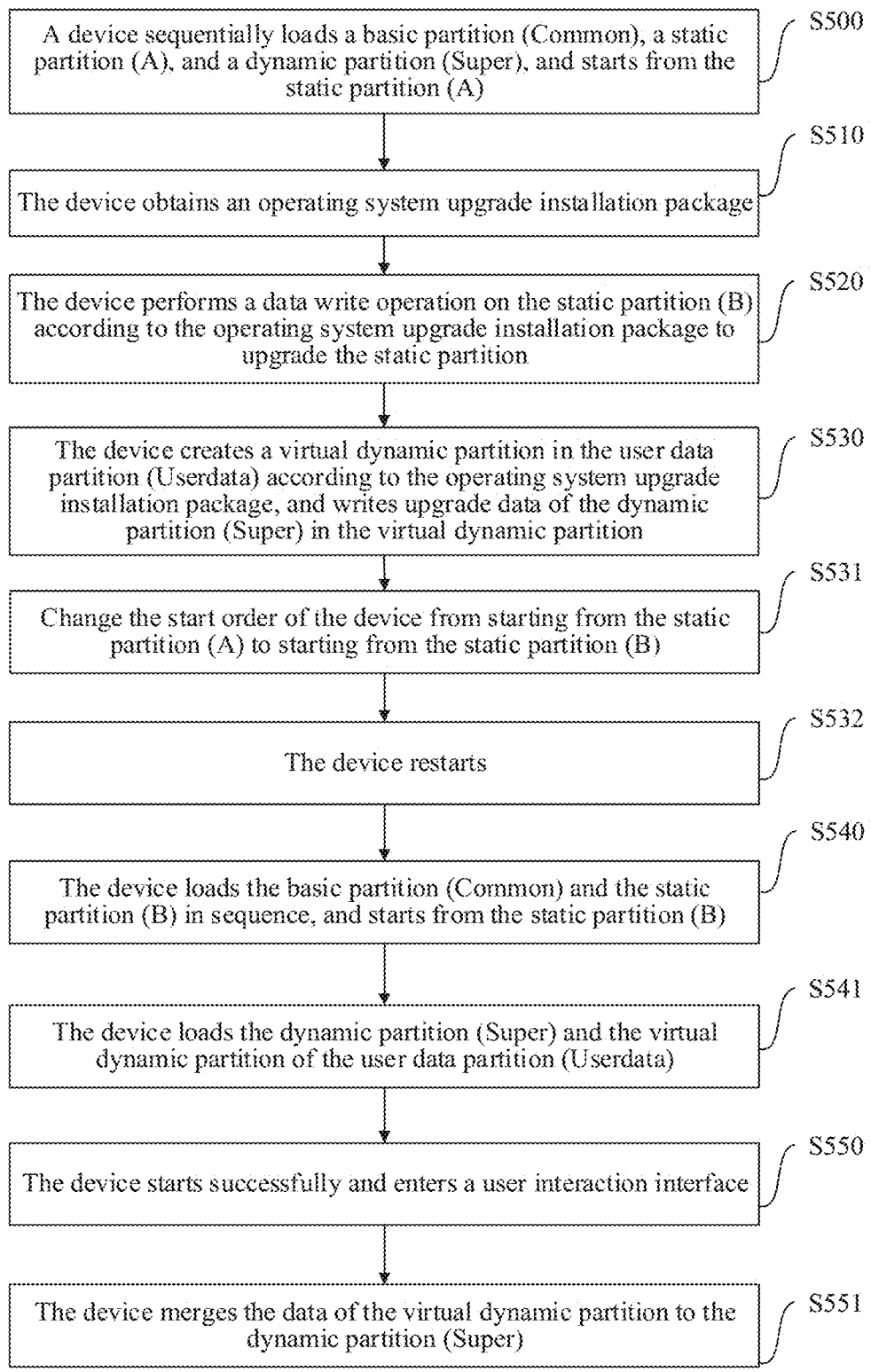
FIG. 5 is a flowchart of upgrading an operating system according to an embodiment of this application.

FIG. 5 is a flowchart of upgrading an operating system for the operating system data storage structure in the embodiment shown in FIG. 4. When the device is currently started from the static partition (A), the device implements operating system upgrade according to the process shown in FIG. 5.

S500. The device sequentially loads the basic partition (Common), the static partition (A), and the dynamic partition (Super), and starts from the static partition (A).

S510. The device obtains an operating system upgrade package.

For example, in a feasible implementation, the device periodically initiates a package search request to a package search server, where the package search request includes a version number (for example, version 1.1) of an operating system currently running on the device. The package search server retrieves, according to the operating system version number in the package search request, whether an operating system installation package (for example, version 1.2) with an updated version number currently exists; and when an operating system installation package of an updated version exists, the package search server feeds back a download address of the operating system upgrade package (for example, a system incremental upgrade installation package upgraded from version 1.1 to version 1.2) to the device. The device downloads the operating system upgrade package according to a download address of the operating system upgrade package.

S520. The device performs a data write operation on the static partition (B) according to the operating system upgrade package to upgrade the static partition.

During execution of S520, S520 fails to be performed (static partition upgrade fails). In this case, the device interrupts the entire operating system upgrade operation, outputs an upgrade failure prompt to the user (for example, a dialog box for displaying an upgrade failure), and automatically re-upgrades or the user determines whether to upgrade again or abort the upgrade.

To detect whether the static partition upgrade fails in S520, in S520, data check is performed on the static partition (B) after data write to determine whether static partition data is successfully written.

For example, in an application scenario, the system upgrade installation package from version 1.1 to version 1.2 contains full data of the static partition of version 1.2 and a hash value of the full data of the static partition of version 1.2. The device overwrites the full amount of data of the static partition of version 1.2 to the static partition (B). After the data is written, the device calculates a hash value of the data in the static partition (B), and checks whether the hash value of the data in the static partition (B) is consistent with a hash value of full data of the static partition in the system upgrade installation package in version 1.2 after upgrade from version 1.1 to version 1.2. If they are consistent, it indicates that the data is successfully written, and a subsequent operating system upgrade operation can be performed. If not, the data write fails and the upgrade fails.

In another example, in an application scenario, the system upgrade installation package of version 1.1 to version 1.2 includes differential data of static partitions of version 1.1 to version 1.2, a hash value of full data of a static partition of version 1.1, and a hash value of full data of a static partition of version 1.2.

Before writing the data to the static partition (B), the device first calculates the hash value of the data in the static partition (A), checks whether the hash value of the data in the static partition (A) is consistent with the hash value of full data of the static partition of version 1.1 in the system upgrade installation package from version 1.1 to version 1.2, and if they are consistent, it indicates that data in the current static partition (A) is static partition data of version 1.1, and differential data of the static partition from version 1.1 to version 1.2 is available. If not, the differential data from version 1.1 to the static partition of version 1.2 is unavailable, and the upgrade fails.

After the device determines that the differential data of the static partition upgraded from version 1.1 to version 1.2 is available, the device reads the data in the static partition (A), upgrades the differential data of the static partition upgraded from version 1.1 to version 1.2 and performs restoration on the data in the static partition (A) to obtain the full data of the static partition of version 1.2, and overwrites the full data of the static partition of version 1.2 to the static partition (B). After the data is written, the device calculates a hash value of the data in the static partition (B), and checks whether the hash value of the data in the static partition (B) is consistent with a hash value of full data of the static partition in the system upgrade installation package in version 1.2 after upgrade from version 1.1 to version 1.2. If they are consistent, it indicates that the data is successfully written, and a subsequent operating system upgrade operation can be performed. If not, the data write fails and the upgrade fails.

A sub-partition boot of a static partition is used as an example. In an application scenario, the system upgrade installation package from version 1.1 to version 1.2 includes the following data:

Name:boot (partition name, indicating that the current data is upgrade data that points to a sub-partition boot of a static partition)

Start: 12222 (start address of a data block, indicating that a start location of upgrade data (differential data DELTA1) of the sub-partition boot of the static partition is 12222)

size: 2410 (data size, indicating that the size of the upgrade data (differential data DELTA1) of the sub-partition boot of the static partition is 2410)

Original hash value: HASH11 (the hash value of the data of the sub-partition boot of the static partition of version 1.1)

Image target hash value: HASH12 (hash value of the data of the sub-partition boot of the static partition of version 1.2)

Differential data delta: DELTA1 (differential data of the static partition upgraded from version 1.1 to version 1.2)

In S520, the device reads a fixed mount path of the device through a misc partition in a common partition, such as/dev/block/by-name/misc. Read a card slot (slot-b) from a UFS component to obtain a sub-partition path, such as/dev/block/by-name/boot_b.

Continue to take the sub-partition boot as an example. The device first calculates the hash value of the data in the /dev/block/by-name/boot_a, and checks whether the hash value of the data in the /dev/block/by-name/boot_a is consistent with the hash value HASH11. If they are consistent, DELTA1 is available. If they are inconsistent, the upgrade operation fails.

When the hash value of the data in the /dev/block/by-name/boot_a is consistent with the hash value HASH11, the device reads DELTA1 based on the Start: 12222 and the size: 2410, and performs restoration on the data in DELTA1 and the /dev/block/by-name/boot_a to obtain the full data of the sub-partition boot of the static partition in the version 1.2. The device writes the full data of the sub-partition boot of the static partition of version 1.2 to /dev/block/by-name/boot_b.

After the data is written, the device calculates the hash value of the data in the /dev/block/by-name/boot_b, and checks whether the hash value of the data in the /dev/block/by-name/boot_b is consistent with the hash value HASH12. If they are consistent, the sub-partition boot of the static partition is upgraded successfully, and may be upgraded to a next static partition sub-partition. If not, the upgrade operation fails.

In an application scenario, the device upgrades the sub-partition of the static partition according to the sub-partition upgrade data of the static partition included in the system upgrade installation package. Specifically, if the system upgrade installation package includes sub-partition upgrade data of a static partition, the device upgrades the sub-partition in the static partition (B) according to the upgrade process of the boot sub-partition. If the system upgrade installation package does not include sub-partition upgrade data of a static partition, the device directly synchronizes the data of the sub-partition in the static partition (A) to the sub-partition of the static partition (B). During the upgrade, if an upgrade error occurs in the sub-partition and the hash check fails, the upgrade operation is interrupted and the upgrade fails. When all sub-partitions are upgraded successfully, the static partition is upgraded successfully and subsequent steps can be performed.

Further, when the upgrade of the static partition (the static partition (A) or the static partition (B)) fails, the data of the static partition cannot be used to successfully start the operating system. To avoid an operating system start error caused by loading the static partition that fails to be upgraded in the operating system start process, in an application scenario, the static partition has a corresponding status mark (bootable or unbootable). Before loading the data of the static partition, the device first reads the status mark of the static partition, and loads the data of the static partition only when the status mark of the static partition is bootable. Before the data of the static partition is upgraded, the static partition is marked as unbootable. After the data of the static partition is upgraded successfully, the static partition is marked as bootable. In this way, if the upgrade of the static partition fails, the status of the static partition remains unbootable. The device does not load the data of the static partition that fails to be upgraded.

For example, in S520, before the data of the static partition (B) is upgraded, the static partition (B) is marked as unbootable. Specifically, the status mark of the static partition is stored in the Common partition. In S520, before the data of the static partition (B) is upgraded, slot-b in the status mark of the static partition in the Common partition is marked as unbootable. When S520 is successfully executed (all hash check is successfully executed), the static partition (B) is marked as bootable. For example, after S520, slot-b in the status mark of the static partition in the Common partition is marked as bootable.

S530. The device creates a virtual dynamic partition in the user data partition (Userdata) according to the operating system upgrade package, and writes upgrade data of the dynamic partition (Super) in the virtual dynamic partition. For example, in an operating system upgrade package containing data for the dynamic partition of version 1.2, the device writes data for the dynamic partition (Super) of version 1.2 in the virtual dynamic partition.

Further, in the virtual A/B upgrade solution, an incremental upgrade manner is used for the dynamic partition (Super). In the upgrade process, the virtual dynamic partition of the user data partition (Userdata) stores not all files of the dynamic partition (Super) of the new version after upgrade, but an upgrade result of data that needs to be upgraded in the dynamic partition (Super) of the old version after upgrade. That is, the update data of the dynamic partition is stored in the virtual dynamic partition of the user data partition (Userdata).

The system sub-partition is used as an example. It is assumed that in version 1.1, data in the system sub-partition may be divided into two parts: system1 and system2. When upgrading from version 1.1 to version 1.2, the data system2 does not change, and the data syetem1 is upgraded to system3. Then, in S530, the device creates a virtual dynamic partition in the user data partition (Userdata) and writes the data system3 in the virtual dynamic partition.

For example, the system incremental upgrade installation package from version 1.1 to version 1.2 contains the update data of the dynamic partition (Super) from version 1.1 to version 1.2, and the update data of the dynamic partition (Super) contains the data system3.

Further, in the virtual A/B upgrade solution, the incremental upgrade of the dynamic partition (Super) is implemented based on a snapshot technology (snapshot). Specifically, in the virtual dynamic partition of the user data partition (Userdata), a copy-on-write (Copy-On-Write, COW) file is used to store the upgrade data of the dynamic partition (Super).

Specifically, the upgrade data of the dynamic partition (Super) stored in the user data partition (Userdata) includes a plurality of COW files, each COW file is corresponding to a sub-partition of one dynamic partition (Super), and a name of the COW file is corresponding to a sub-partition of the dynamic partition (Super) to which the COW file is corresponding.

In the operating system upgrade package obtained in S510, the COW file of the upgrade data of the dynamic partition (Super) is compressed and saved in a binary code form. In the operating system upgrade package, each COW file is named according to the sub-partition of the dynamic partition (Super) to which it is directed. For example, the COW file for the system sub-partition is named system-cow-img.img.0000.

In S530, the device unpacks the operating system upgrade package to obtain all COW files, and appends an A/B partition tag to each COW file. Specifically, when the device currently starts from the static partition (A), it may be understood that the dynamic partition (Super) loaded by the device currently running an operating system is the dynamic partition (A). When upgrading the operating system, the virtual dynamic partition created in the user data partition (Userdata) is for the dynamic partition (B). Therefore, the name tag_b corresponding to the dynamic partition (B) is attached to the COW file. For example, system_b-cow-img.img.0000 is generated for system-cow-img.img.0000 additional_b.

Further, in S530, an update folder is created in the user data partition (Userdata), and a renamed COW file is saved in the update folder. For example, in an application scenario, after a COW file is written to the user data partition (Userdata), the update folder of the user data partition (Userdata) includes the following files:

system_b-cow-img.img.0000;
system_ext_b-cow-img.img.0000;
vendor_b-cow-img.img.0000;
product_b-cow-img.img.0000;
cust_b-cow-img.img.0000;
odm_b-cow-img.img.0000.

Specifically, the COW file includes a COW file map (snapshot map) of the COW file and upgrade data.

The COW file map (snapshot) corresponds to the file map of the sub-partition of the dynamic partition (Super) to which the COW file is directed. The file map of the sub-partition of the dynamic partition (Super) is used to describe all files in the sub-partition of the dynamic partition (Super) of the current version of the operating system (version prior to this upgrade, e.g., version 1.1) and storage addresses of individual files.

The upgrade data in the COW file is the updated file in the sub-partition data of the new version compared with the sub-partition data of the current version. The COW file map of the COW file is used to describe the correspondence between the updated file and the file in the sub-partition of the current version and the storage address of the updated file.

Based on the file map of the sub-partition of the dynamic partition (Super) and the COW file map in the COW file, the corresponding file in the sub-partition of the dynamic partition (Super) may be replaced with the upgrade data in the COW file, thereby implementing upgrade of the data of the dynamic partition (Super). Specifically, when the file map of the sub-partition of the dynamic partition (Super) needs to be obtained, a snapshot operation may be performed, based on the snapshot, on the data of the sub-partition of the dynamic partition (Super), to generate the file map of the sub-partition of the dynamic partition (Super). When an operating system upgrade package is created, a file map of the sub-partition of the dynamic partition (Super) is generated in advance, and the file map is added to the COW file.

The system sub-partition is used as an example. It is assumed that data is saved in the system sub-partition according to the following path:

/system/app/A0.XXX;
/system/app/A1.XXX;
/system/app/A2.XXX;
/system/B0.XXX;
/system/B1.XXX;
/system/user/C0.XXX;
/system/user/C1.XXX:
/system/user/C2.XXX;
/system/user/C3.XXX.

The file map of the system sub-partition may be as follows:

/system/app/A0.XXX: 024010-024013:
/system/app/A1.XXX: 024014-024017;
/system/app/A2.XXX: 024018-024020;
/system/B0.XXX: 024021-024026:
/system/B1.XXX: 024027-024028;
/system/user/C0.XXX: 024029-024032;
/system/user/C1.XXX: 024033-024035;
/system/user/C2.XXX: 024036-024040;
/system/user/C3.XXX: 024041-024044.

The value after the file name (e.g., /system/app/A0.XXX: 024010-024013 in 024010-024013) is the physical storage address (block address) of the file in the system sub-partition of the dynamic partition (Super).

It is assumed that current operating system upgrade needs to update data /system/app/A2.XXX and/system/user/C2.XXX.

It may be considered as:
/system/app/A2.XXX and/system/user/C2.XXX are the system1 part of the system sub-partition data;
/system/app/A0.XXX, /system/app/A1.XXX, /system/B0.XXX, /system/B1.XXX, /system/user/C0.XXX, /system/user/C1.XXX, and /system/user/C3.XXX are the system2 part of the system sub-partition data.

Then, the COW file (system_b-cow-img.img.0000) for the system sub-partition contains the latest version of/system/app/A2.XXX and /system/user/C2.XXX.

It may be considered that the latest version of /system/app/A2.XXX and /system/user/C2.XXX is system3. The upgrade target is to use system3 to update system1.

The map of the COW file (system_b-cow-img.img.0000) may be as follows:
/system/app/A2.XXX:
Map1 (address of to-be-updated data in the original super partition): start address address start: 024018 (offset relative to the system start address); offset size size: 2 (that is, data of 024018-024020 address segment)

Map2 (address of the update data stored in the cow file): start address address start: 045033 (offset relative to the start address stored in the cow file); offset size size: 2 (that is, data of the 045033-045035 address segment):

/system/user/C2.XXX:

Map1 (address of to-be-updated data in the original super partition): start address address start: 024036 (offset relative to the system start address); offset size size: 4 (that is, data of 024036-024040 address segment)

Map2 (address of the update data stored in the cow file): start address address start: 045036 (offset relative to the start address stored in the cow file); offset size size: 4 (that is, data of the 045036-045040 address segment);

The values (045033-045035 and 045036-045040) after the file name are respectively the latest version of /system/app/A2.XXX in the COW file (system_b-cow-img.0000) and the physical storage address (block address) of the /system/user/C2.XXX in the user data partition (Userdata).

In this way, if A2.XXX on the address 045033-045035 is replaced with A2.XXX on the address 024018-024020, and C2.XXX on the address 024036-024040 is replaced with C2.XXX on the address 045036-045040, the data upgrade of the system sub-partition of the dynamic partition (Super) can be completed.

After the COW file is successfully written to the user data partition (Userdata), the merge status information in the metadata partition (/metadata) of the basic partition (Common) is changed from "merged (merged)" to "wait for merge (wait for merge)". The merge status information is used to indicate whether a COW file that needs to be merged to the dynamic partition (Super) exists currently. Specifically, the merge status information includes an overall identifier for the dynamic partition (Super) and a sub-partition identifier for each sub-partition. When the overall identifier is "merged (merged)", all sub-partitions representing the dynamic partition (Super) do not require a merged operation; when the overall identifier is "wait for merge (wait for merge)", one or more sub-partitions representing the dynamic partition (Super) require a wait for merge operation; when the sub-partition identifier is "merged (merged)", it indicates that the sub-partition does not need to perform a merged operation. When the sub-partition identifier is "wait for merge (wait for merge)", the sub-partition needs to perform a wait for merge operation.

Further, in some application scenarios, in S530, the device writes not only the COW file to the user data partition (Userdata), but also refreshes the partition information in the metadata of the dynamic partition (Super).

Figure 6:
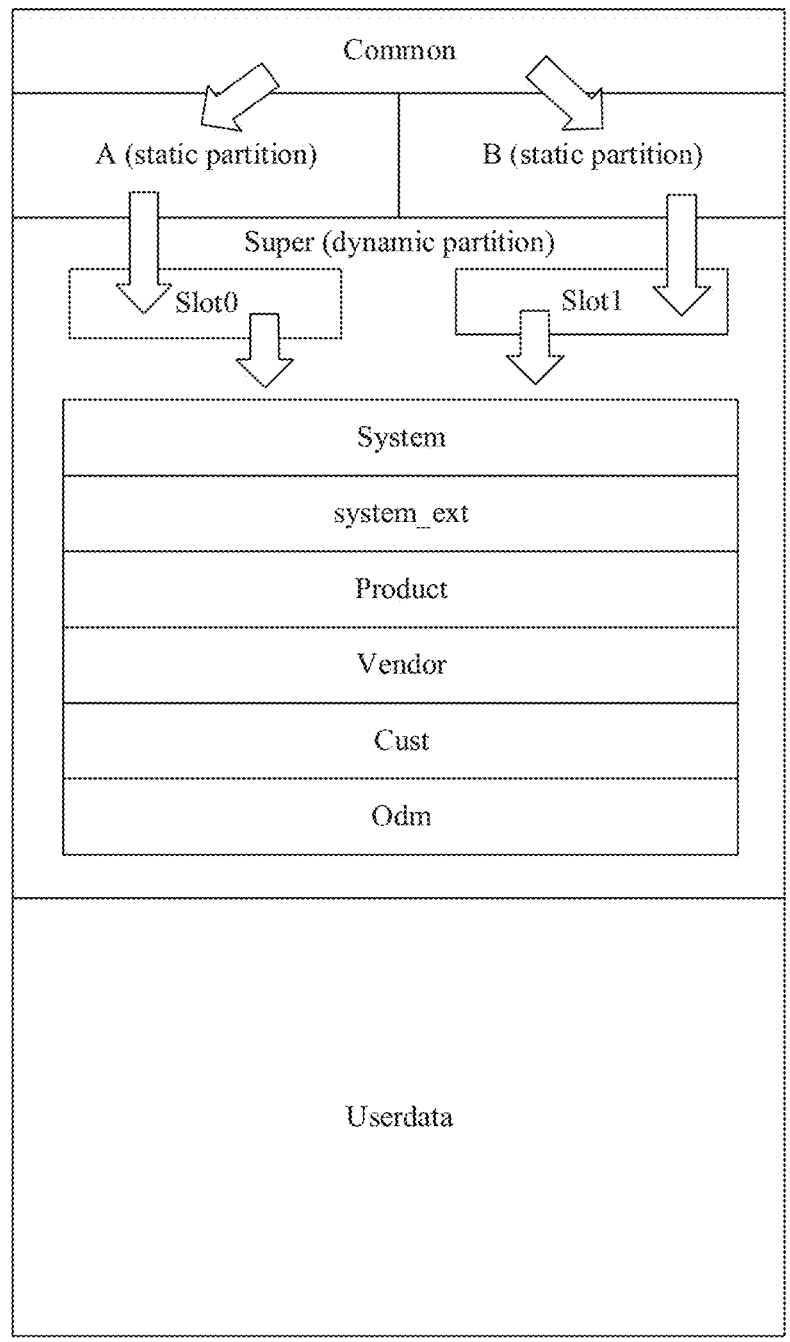
FIG. 6 is a schematic structural diagram of a burning system frame for performing system burning before factory delivery according to an embodiment of this application.

Specifically, FIG. 6 is a schematic structural diagram of a burning system frame for system burning before a device is delivered from a factory in an application scenario. In an Android system in a virtual A/B upgrade manner, only a static partition uses the A/B solution, while a dynamic partition uses the solution of constructing a virtual dynamic partition during upgrade. Thus, to match the static partition to the dynamic partition, as shown in FIG. 4, the metadata (/supermetadata) in the header of the dynamic partition (Super) includes Slot0 (slot-1 data) corresponding to the static partition (A) and Slot1 (slot-2 data) corresponding to the static partition (B). Slot0 and Slot1 are used to store a partition table of the Super partition.

For example, in a MBR of a UFS, in the device start sequence description, the configuration Slot0 is correspondingly started from the static partition (A), and the configuration Slot1 is correspondingly started from the static partition (B). When the device starts, the device selects to obtain the partition information of the Super partition from one of Slot0 or Slot1 according to different started static partitions. For example, when the device is started by the static partition A, and the Super partition is loaded, the device first reads Slot0 to obtain a sub-partition address of the Super partition. When the device is started by the static partition B, and the Super partition is loaded, the device first reads Slot1 to obtain the sub-partition address of the Super partition.

Specifically, Slot0 and Slot1 include a plurality of sub-partition description groups, and each sub-partition description group corresponds to one sub-partition of the Super partition. Each sub-partition description group includes:

Name (Name) item, whose value is the name of the sub-partition;

a group (Group) item whose value is a sub-partition type, an attribute (Attributes) item whose value is a partition read-write attribute, such as a read-only attribute (readonly);

an address (Extents) item whose value is the address of the sub-partition (e.g., partition size, offset).

In the Name item and the Group item, if the suffix of the value is _a, it corresponds to the static partition (A). If the suffix of the value is _b, it corresponds to the static partition (B).

When starting from the static partition A and loading the Super partition, read Slot0 first. When Slot0 is read, because the suffix is _a corresponding to the static partition (A), the device reads the value of the Extents item in the partition description group whose Name item and/or Group item suffix is _a in Slot0, so as to obtain the sub-partition address of the Super partition.

When starting from static partition B and loading the Super partition, read Slot1 first. When Slot1 is read, because the suffix is _b corresponding to the static partition (b), the device reads the value of the Extents item in the partition description group whose Name item and/or Group item suffix is _b in Slot0, so as to obtain the sub-partition address of the Super partition.

The operating system upgrade package obtained in S510 includes the partition information of the dynamic partition (Super) of version 1.2. In S530, the device extracts the partition information of the dynamic partition (Super) of version 1.2 from the operating system upgrade package, and refreshes partition information of Slot1 corresponding to the static partition (B) by using the partition information of the dynamic partition (Super) of version 1.2.

The system sub-partition is used as an example. It is assumed that before S530, Slot 1 of the/supermetadata of the dynamic partition (Super) includes the following content:

Metadata version: 10.2
Metadata size: 1300 bytes
Metadata max size: 65536 bytes
Metadata slot count: 3
Header flags: virtual_ab_device
Partition table: ------------------------
Name: system_b
Group: ry_dynamic_partitions_b
Attributes: readonly, updated
Extents: 0 . . . 6995967 linear super 2048

In the operating system upgrade package obtained in S510, the partition information of the dynamic partition (Super) of version 1.2 includes the following content:

Name: system
Group: ry_dynamic_partitions
Extents: 0 . . . 699XXXX linear super 2048

In S530, the device locates Slot 1 of the/supermetadata corresponding to the dynamic partition (Super) of the static partition (B) by using the static partition (B) that currently needs to be upgraded, and refreshes the content in Slot 1 by using the partition information of the dynamic partition (Super) of version 1.2. After S530, Slot 1 of the/supermetadata of the dynamic partition (Super) includes the following content:

Metadata version: 10.2

Metadata size: 1300 bytes

Metadata max size: 65536 bytes

Metadata slot count: 3

Header flags: virtual_ab_device

Partition table: -----------------------

Name: system_b

Group: ry_dynamic_partitions_b

Attributes: readonly, updated

Extents: 0 . . . 699XXXX linear super 2048

Further, in the execution process of S530, a case in which the S530 fails to be executed exists. In this case, the device interrupts the entire operating system upgrade operation, outputs an upgrade failure prompt to the user (for example, a dialog box for displaying an upgrade failure), and automatically re-upgrades or the user determines whether to upgrade again or abort the upgrade. (Refer to the data write failure of the static partition in S520)

Specifically, when storage space of the user data partition (Userdata) is insufficient, execution of S530 may fail. In S530, in a process in which the device creates a virtual dynamic partition in the user data partition (Userdata) according to an operating system upgrade package, a size of the virtual dynamic partition is determined by a size of data of the dynamic partition of version 1.2 in the operating system upgrade package. Execution of S530 fails when the free space on the user data partition (Userdata) is insufficient to create the virtual dynamic partition.

For example, in an application scenario, the device extracts a COW file from the operating system upgrade package and writes the COW file to the update folder of the user data partition (Userdata). The operating system upgrade package contains the content of the COW file and the size of the COW file. In S530, the device first creates an empty COW file in the update folder of the user data partition (Userdata) according to the cow file name and the COW file size in the operating system upgrade package, and then extracts the COW file data from the operating system upgrade package and writes it to an empty COW file.

The system sub-partition is used as an example. In the operating system upgrade package, a COW file for the system sub-partition is named system-cow-img.img.0000, and a size of system-cow-img.img.0000 is XXXX. The device creates the system_b-cow file in the update folder of the user data partition (Userdata). The size of the system_b-cow file is XXXX, and the content is empty. After the system_b-cow file is created, the device can extract the system-cow-img.img.0000 from the system upgrade installation package, write it to the system_b-cow, and rename it to system_b-cow-img.img.0000.

The device creates empty COW files system_b-cow, system_ext_b-cow, vendor_b-cow, product_b-cow, cust_b-cow, and odm_b-cow in the update folder of the user data partition (Userdata). After all the empty COW files are created, the device can extract the COW file data from the system upgrade installation package, write them into the empty COW file and rename them.

The update folder of the user data partition (Userdata) contains the following files:

system_b-cow-img.img.0000;

system_ext_b-cow-img.img.0000;

vendor_b-cow-img.img.0000;

product_b-cow-img.img.0000;

cust_b-cow-img.img.0000;

odm_b-cow-img.img.0000.

During the process of creating an empty COW file, the device creates an empty COW file each time. After the creation of an empty COW file succeeds, the device creates a next COW file. In this process, when an empty COW file fails to be created, it indicates that storage space of the user data partition (Userdata) is insufficient, S530 fails to be executed, and the operating system upgrade fails.

Further, in S530, a failure in extracting the COW file also causes a failure in execution of S530. Specifically, in the operating system upgrade package, the COW file is saved in binary code. When the COW file is written into the user data partition (Userdata), the COW file needs to be first extracted from the operating system upgrade package, the COW file is opened, and the COW file data is written into the user data partition (Userdata). In the foregoing process, if the operating system upgrade package has a data error and the COW file cannot be extracted or opened, S530 fails to be executed and the operating system upgrade fails.

Further, in S530, a failure in writing the COW file also causes a failure in execution of S530. To detect whether the COW file is successfully written, in S530, after the COW file is written to the user data partition (Userdata), the dynamic partition (Super)+COW file need to be checked as a whole, and validity of the dynamic partition (Super)+COW file needs to be checked, so as to verify whether the combination result of the dynamic partition (Super) data+COW file of the current version is the data of the dynamic partition (Super) of the new version.

Specifically, upgrade from version 1.1 to version 1.3 is used as an example, a hash value of a combination result of data that does not need to be upgraded (data that does not change from version 1.1 to version 1.2) in the dynamic partition (Super) and data that needs to be upgraded (data that needs to be upgraded from version 1.1 to version 1.2) in the COW file is calculated, and it is determined whether the hash value is consistent with a hash value of full data of the dynamic partition (Super) in version 1.3. If they are consistent, it indicates that the COW file is valid. If not, the COW file is invalid, the upgrade fails, the upgrade process is interrupted, and an error is reported. In version 1.3, the hash value of the full data of the dynamic partition (Super) is stored in the operating system upgrade package.

Specifically, in a verification process, the dynamic partition (Super)+COW file are combined based on a snapshot. In an implementation process of the snapshot, a combination of the dynamic partition (Super) and the COW file is not a physical combination, but a whole file map of the system sub-partition is combined with a COW file map of the COW file to generate a file map of sub-partition data of a new version.

For example, the file map of the system sub-partition is as follows:

/system/app/A0.XXX: 024010-024013:

/system/app/A1.XXX:024014-024017;

/system/app/A2.XXX: 024018-024020;

/system/B0.XXX: 024021-024026:

/system/B1.XXX: 024027-024028:

/system/user/C0.XXX: 024029-024032;

/system/user/C1 XXX: 024033-024035;

/system/user/C2.XXX: 024036-024040;
/system/user/C3.XXX: 024041-024044.
Map with the COW file:
/system/app/A2.XXX: 045033-045035;
/system/user/C2.XXX: 045036-045040.
Merge. Obtain the file map of the new version of the system sub-partition:
/system/app % A0.XXX: 024010-024013:
(Point to A0.XXX under/system/app in the dynamic partition (Super))
/system/app/A1.XXX:024014-024017;
(Point to A1.XXX under/system/app in the dynamic partition (Super))
/system/app/A2.XXX: 045033-045035:
(Point to A2.XXX in/Update/system_b-cow-img.img.0000 in the user data partition (Userdata))
/system/B0.XXX: 024021-024026;
(Point to B0.XXX under/system in the dynamic partition (Super))
/system/B1.XXX: 024027-024028;
(Point to B1.XXX under/system in the dynamic partition (Super))
/system/user/C0.XXX: 024029-024032;
(Point to C0.XXX under/system/user in the dynamic partition (Super))
/system/user/C1.XXX: 024033-024035;
(Point to C1.XXX under/system/user in the dynamic partition (Super))
/system/user/C2.XXX: 045036-045040;
(Point to C2.XXX in/Update/system_b-cow-img.img.0000 in the user data partition (Userdata))
/system/user/C3.XXX: 024041-024044.
(Point to C3.XXX under/system/user in the dynamic partition (Super))
in the file map of the new version of the system sub-partition, the save address of the /system/app/A2.XXX does not point to the /system/app/A2.XXX on the dynamic partition (Super) on the memory, but to A2.XXX in the system_b-cow-img.img.0000 on the user data partition (Userdata) on the memory. The save address of the /system/user/C2.XXX does not point to the /system/user/C2.XXX on the dynamic partition (Super), but to the C2.XXX in the system_b-cow-img.img.0000 in the user data partition (Userdata).

In a verification process, file maps of new versions of all sub-partitions of the dynamic partition (Super) are obtained according to the foregoing combination manner (if a corresponding COW file of a sub-partition is not written in the user data partition (Userdata), the file map of the sub-partition is directly used as the file map of the new version). The file maps of the new versions of all the sub-partitions are combined to generate a file system of a new version of the dynamic partition (Super).

Data is read based on the file system of the new version of the dynamic partition (Super), all files contained in the file system of the new version of the dynamic partition (Super) are read, and a hash value is calculated.

S531. Change the start order of the device from starting from the static partition (A) to starting from the static partition (B).

For example, a start sequence identifier of a master boot record (Master Boot Record, MBR) is overwritten, and the start sequence identifier is overwritten from A to B. After the device is powered on, when the device reads that the start sequence identifier is A, the device starts from the static partition (A), and loads the static partition (A) in a start process. When the device reads that the start sequence identifier is B, the device starts from the static partition (B), and loads the static partition (B) during start.

Further, in S531, slot-b in the status mark of the static partition in the Common partition is further marked as bootable.

S532: The device restarts. Exit the current operating system, power off the device, and power on the device again.

S540. The device sequentially loads the basic partition (Common) and the static partition (B).

S541. The device loads the dynamic partition (Super) and the virtual dynamic partition of the user data partition (Userdata).

Specifically, the device reads the merge status information in the /metadata (/metadata), determines, based on the merge status information, whether a COW file needs to be retrieved from a specified path of the user data partition (Userdata), and loads the dynamic partition (Super) and the COW file together by using the snapshot.

Further, in S541, the device does not load all COW files in the dynamic partition (Super) and the user data partition (Userdata), but loads a corresponding file according to an operating system running requirement. Specifically, in S541, the device determines, according to the operating system running requirement, a file that needs to be loaded, and extracts, based on the snapshot, a corresponding file from the COW file in the dynamic partition (Super) or a virtual dynamic partition to be loaded.

Specifically, in S541, when a corresponding COW file exists at the head of the sub-partition of the dynamic partition (Super), a file map of a new version of each sub-partition of the dynamic partition (Super) is first generated based on the snapshot. For the process of generating a file map of a new version, refer to S530. The device determines, according to the operating system operation requirement, a file that needs to be loaded, and loads the file based on the file map of the new version of the sub-partition of the dynamic partition (Super).

For example, operating system operation requires loading all data in directory user (/system/user) under the system sub-partition. The device reads the merge status information in the /metadata (/metadata), and a sub-partition identifier of the system sub-partition in the merge status information is "wait for merge (wait for merge)". Therefore, the device searches for the COW file in the user data partition (Userdata), finds the COW file system_b-cow-img.img.0000 under /Update, and generates a file map of a new version of the system sub-partition based on the snapshot and the file map of the COW file in the system_b-cow-img.img.0000. The data is loaded according to the storage address of all files under /system/user in the file map of the new version of the system sub-partition, for example, according to the file map of the new version of the system sub-partition:
/system/user/C0.XXX: 024029-024032;
/system/user/C1.XXX: 024033-024035;
/system/user/C2.XXX: 045036-045040;
/system/user/C3.XXX: 024041-024044.
Load C0.XXX at address 024029-024032, C1.XXX at address 024033-024035, C2.XXX at address 045036-045040, and C3.XXX at address 024041-024044.

Further, when all data in the directory user (/system/user) in the system sub-partition is loaded, when the sub-partition identifier of the system sub-partition in the system sub-partition in the merge status information is "merged (merged)", the device does not search for the COW file under /Update in the user data partition (Userdata), but directly loads all data in the directory user (/system/user) in the system sub-partition.

Further, when all data in the directory user (/system/user) in the system sub-partition is loaded, when the sub-partition identifier of the system sub-partition in the system sub-partition in the system sub-partition in the merge status information is "wait for merge (wait for merge)", if the device does not find the COW file corresponding to the system sub-partition under /Update in the user data partition (Userdata), it indicates a data write error (COW file write error or merge status information write error) in an upgrade process. In this case, the device rolls back the system and reports an error.

Further, in S541, before the file is loaded, the device further needs to check the loaded file. Unlike S530, in S541, the dynamic partition (Super)+COW file are not verified as a whole, but only the file that needs to be loaded is verified. For example, check is performed based on dmverity (dm-verity is a target (target) of dm (device mapper), is a virtual block device, and is specifically used for check of a file system). If the check succeeds, the file is loaded. If the check fails, the device is restarted. The system is rolled back or the file is loaded again.

S550. The device starts successfully and enters a user interaction interface.

S551. The device merges the data of the virtual dynamic partition to the dynamic partition (Super).

In the description of the specification of this application, a merge operation means that in an operating system upgrade process, a dynamic partition (Super) upgrade file (COW file) stored in a virtual dynamic partition on a user data partition (Userdata) is written into the dynamic partition (Super), so that a file of the dynamic partition (Super) completes data upgrade, so that the device does not need to load the dynamic partition (Super) and the virtual dynamic partition at a next start, and device start can be completed only by loading the dynamic partition (Super).

Specifically, the device performs power-on broadcast after successful start, and starts an upgrade process after power-on broadcast. The upgrade process reads the merge status information in the metadata (/metadata) of the basic partition (Common). If the merge status information is "merged (merged)", the device enters a normal operation mode.

If the merge status information is "wait for merge (wait for merge)", the upgrade process will merge the COW file in the user data partition (Userdata) to the dynamic partition (Super).

Specifically, the upgrade process writes upgrade data in the COW file in the user data partition (Userdata) into a corresponding address in the dynamic partition (Super), so that all data in the dynamic partition (Super) is data of an upgraded new version.

For example, data at address 045033-045035 is written to address 024014-024017 based on /system/app/A2.XXX: 024018-024020 in the file map of the system sub-partition and /system/app/A2.XXX: 045033-045035 in the COW file map. Write the data on the address 045036-045040 to the address 024036-024040 based on /system/user/C2.XXX: 024036-024040 in the file map of the system sub-partition and /system/user/C2.XXX: 045036-045040 in the COW file map.

After this, the upgrade process deletes the COW file in the user data partition (Userdata), and returns the storage space to the user data partition (Userdata). In addition, the merge status information in the metadata (/metadata) of the basic partition (Common) is changed from "wait for merge (wait for merge)" to "merged (merged)".

In S520, a data operation upgraded by the static partition is for operating system data in the static partition (B), which does not affect operating system data of a currently started static partition (A). In addition, in S530, a data operation of a dynamic partition upgrade is completed on a virtual dynamic partition created in the user data partition (Userdata), which does not affect the currently mounted dynamic partition (Super). Therefore, in an entire operating system upgrade process, a user can normally use the device. In addition, after S531 is completed, the device does not need to restart immediately, and the user may select a restart opportunity. In this way, an upgrade process of the operating system does not affect a normal mobile phone operation of the user, thereby greatly improving user experience. Further, for the dynamic partition (Super), a virtual dynamic partition is created in the user data partition (Userdata) only when upgrade needs to be performed. Therefore, data storage space utilization is effectively improved.

Figure 7:
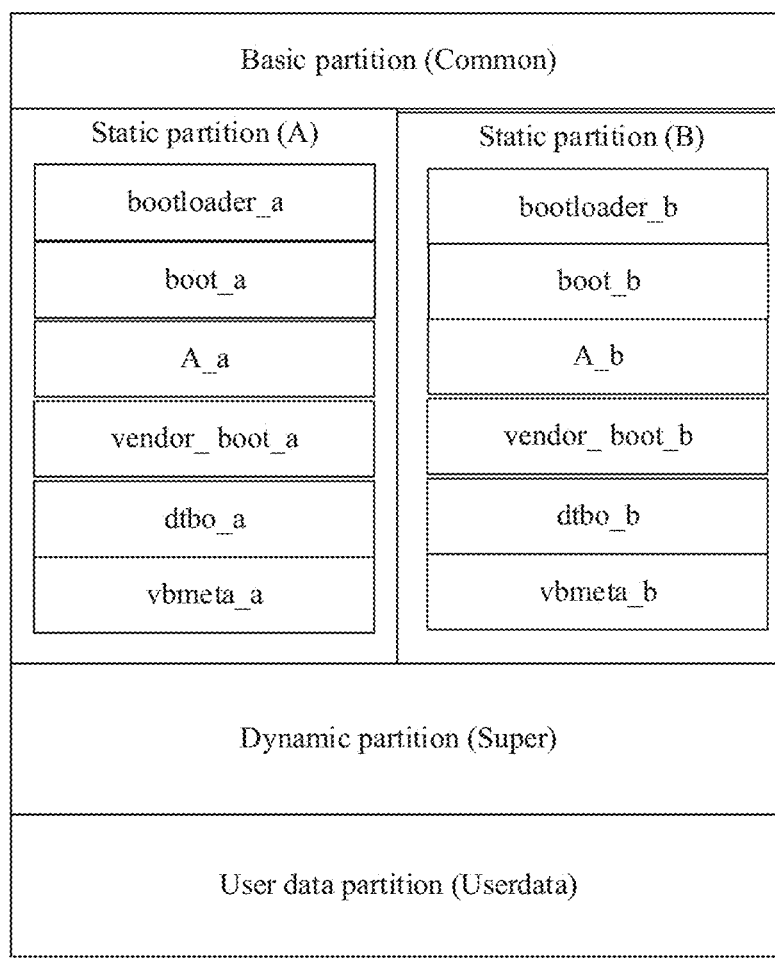
FIG. 7 is a schematic structural diagram of data storage according to an embodiment of this application.

FIG. 7 is a schematic structural diagram of data storage according to an embodiment of this application. If a partition structure shown in FIG. 4 needs to be reconfigured, for example, sub-partitions A_a and A_b are separately added to the static partition (A) and the static partition (B) to obtain the data storage structure shown in FIG. 7, a partition table stored in a disk header (for example, an MBR partition or a GPT partition) of the memory of the device needs to be refreshed to a partition table corresponding to the data storage structure shown in FIG. 7 (the original partition table is a partition table corresponding to the partition structure shown in FIG. 4). In the upgrade process shown in FIG. 5, the device completes an operating system data upgrade in a status in which the operating system runs. In a normal running status of the operating system, the partition table of the disk header of the memory is read-only. Therefore, the partition table cannot be refreshed according to the upgrade process shown in FIG. 5.

Therefore, a logically feasible application solution is to store an operating system upgrade package in the user data partition (Userdata) based on the process shown in FIG. 3. The operating system upgrade package includes a partition table of the data storage structure shown in FIG. 7 and image data of each partition in the data storage structure shown in FIG. 7. After the device restarts, it enters the recovery (Recovery) mode. In the recovery (Recovery) mode, it reads the operating system upgrade package saved in the user data partition (Userdata), refreshes the partition table in the disk MBR by using the partition table in the operating system upgrade package, locates each partition based on the refreshed partition table, and recovers image data of each partition in the operating system upgrade package to each partition.

However, in an Android system in a virtual A/B upgrade manner, to ensure user data security, data stored in the user data partition (Userdata) is encrypted, and the data stored in the user data partition (Userdata) can be accessed only when the Android system runs normally. That is, after the device restarts to enter the recovery (Recovery) mode, the device cannot access data stored in the user data partition (Userdata). In this way, the device cannot reconfigure the partition structure in the recovery mode and write data for each newly configured partition.

To resolve the foregoing problem, this application proposes an operating system upgrade method combined with a virtual A/B upgrade and recovery (Recovery) mode upgrade. In the recovery (Recovery) mode, a partition table is refreshed to reconfigure a partition architecture, and then an operating system is started to upgrade operating system data in the virtual A/B upgrade manner.

Because the operating system needs to be started after the partition architecture is reconfigured, the partitions to be loaded when the operating system is started are still available after the partition architecture is reconfigured. That is, before and after the partition architecture is reconfigured, the start address-end address of each partition to be loaded when the operating system starts remain unchanged. To meet the foregoing requirements, this application provides a new operating system partition architecture. In the partition architecture of this embodiment of this application, not all space of a disk is created as an available partition, but a part of space is reserved as a reserve (reserve) partition. The reserve partition is an unavailable partition, which is not reflected in the available partition of the device when the device runs. That is, it is assumed that the partition architecture corresponding to the operating system is shown in FIG. 4. If the reserve partition is configured on a memory of the device, when the device runs the operating system, the available partition of the device is still shown in FIG. 4, and the reserve partition is not reflected.

When reconfiguring the partition architecture, if a partition needs to be added, the reserve partition is used to create a new partition. If a partition needs to be deleted, the partition that needs to be deleted is converted into a reserve partition. Before and after the partition architecture is reconfigured, other partitions other than the reserve partition remain unchanged.

Figure 8:
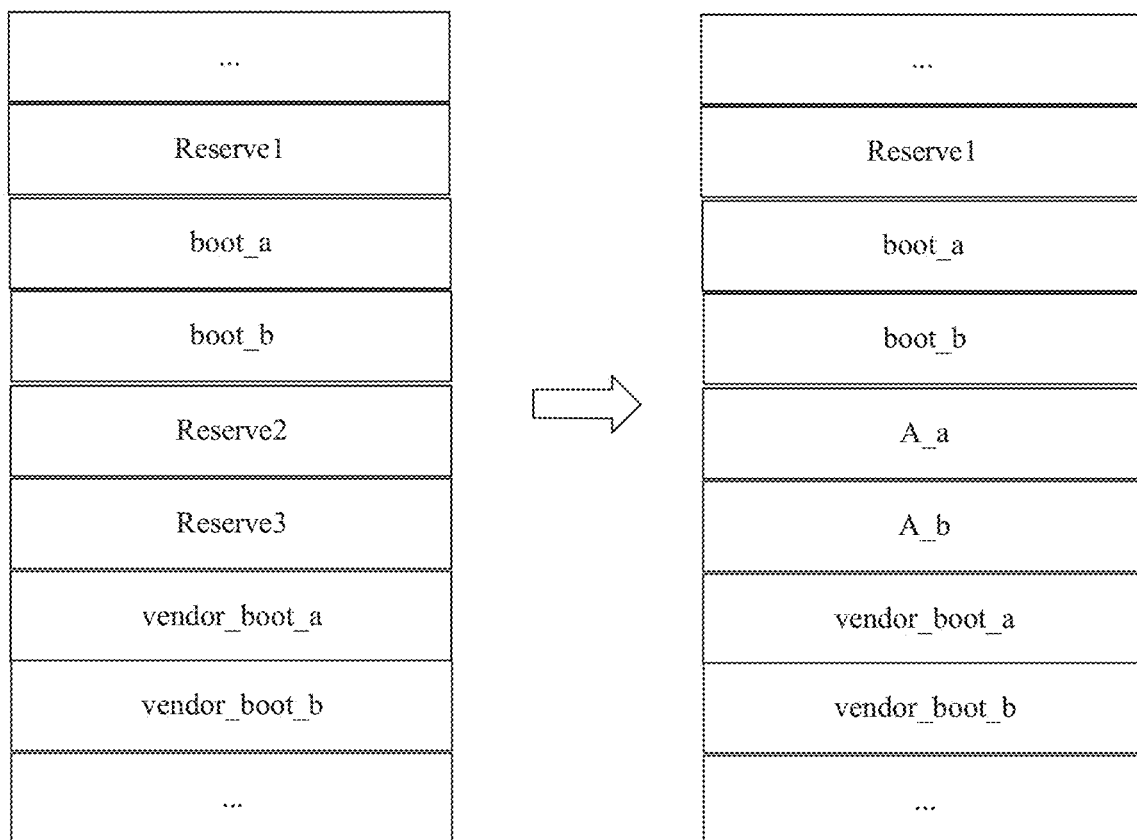
FIG. 8 is a schematic structural diagram of a partition of a reconfiguration partition architecture according to an embodiment of this application.

An application scenario in which a new partition is added is used as an example. FIG. 8 is a schematic structural diagram of a partition of a reconfiguration partition architecture according to an embodiment of this application. Before the partition architecture is reconfigured, the partition architecture shown in FIG. 4 maps to a part of storage space allocation on the memory as shown in the left figure of FIG. 8. A partition table corresponding to the left figure in FIG. 8 is shown in Table 3.

TABLE 3

| Partition number (partition) | Partition name (name) | Partition size (size) | Partition start address-end address (start address-End address) |
|---|---|---|---|
| ... | | | |
| n − 1 | Reserve1 | XX | AD31-AD32 |
| n | boot_a | XX | AD32 + 1-AD33 |
| n + 1 | boot_b | XX | AD33 + 1-AD34 |
| n + 2 | Reserve2 | XX | AD34 + 1-AD35 |
| n + 3 | Reserve3 | XX | AD35 + 1-AD36 |
| n + 4 | vendor_boot_a | XX | AD36 + 1-AD37 |
| n + 5 | vendor_boot_b | XX | AD37 + 1-AD38 |
| ... | | | |

In Table 3, AD31-AD38 respectively represent different address strings. Refer to AD1-AD6 in Table 1. XX is the partition size. XX of different partitions may be the same or different.

The partition architecture shown in FIG. 4 is reconfigured to the partition architecture shown in FIG. 7. After the partition architecture is reconfigured, the partition architecture shown in FIG. 7 is mapped to a part of storage space allocation on the memory as shown in the figure on the right of FIG. 8. A partition table corresponding to the right figure in FIG. 8 is shown in Table 4.

TABLE 4

| Partition number (partition) | Partition name (name) | Partition size (size) | Partition start address-end address (start address-End address) |
|---|---|---|---|
| ... | | | |
| n − 1 | Reserve1 | XX | AD31-AD32 |
| n | boot_a | XX | AD32 + 1-AD33 |
| n + 1 | boot_b | XX | AD33 + 1-AD34 |
| n + 2 | A_a | XX | AD34 + 1-AD35 |
| n + 3 | A_b | XX | AD35 + 1-AD36 |
| n + 4 | vendor_boot_a | XX | AD36 + 1-AD37 |
| n + 5 | vendor_boot_b | XX | AD37 + 1-AD38 |
| ... | | | |

Similarly, for an application scenario of deleting a partition, the foregoing process is reversed, and the deleted partition is configured as a new reserve partition.

Further, according to a size of a new partition to be created, the new partition may be created by cutting a part of space of one reserve partition or merging a plurality of reserve partitions in a manner of partitioning a single reserve partition and/or merging a plurality of reserve partitions.

Figure 9A:
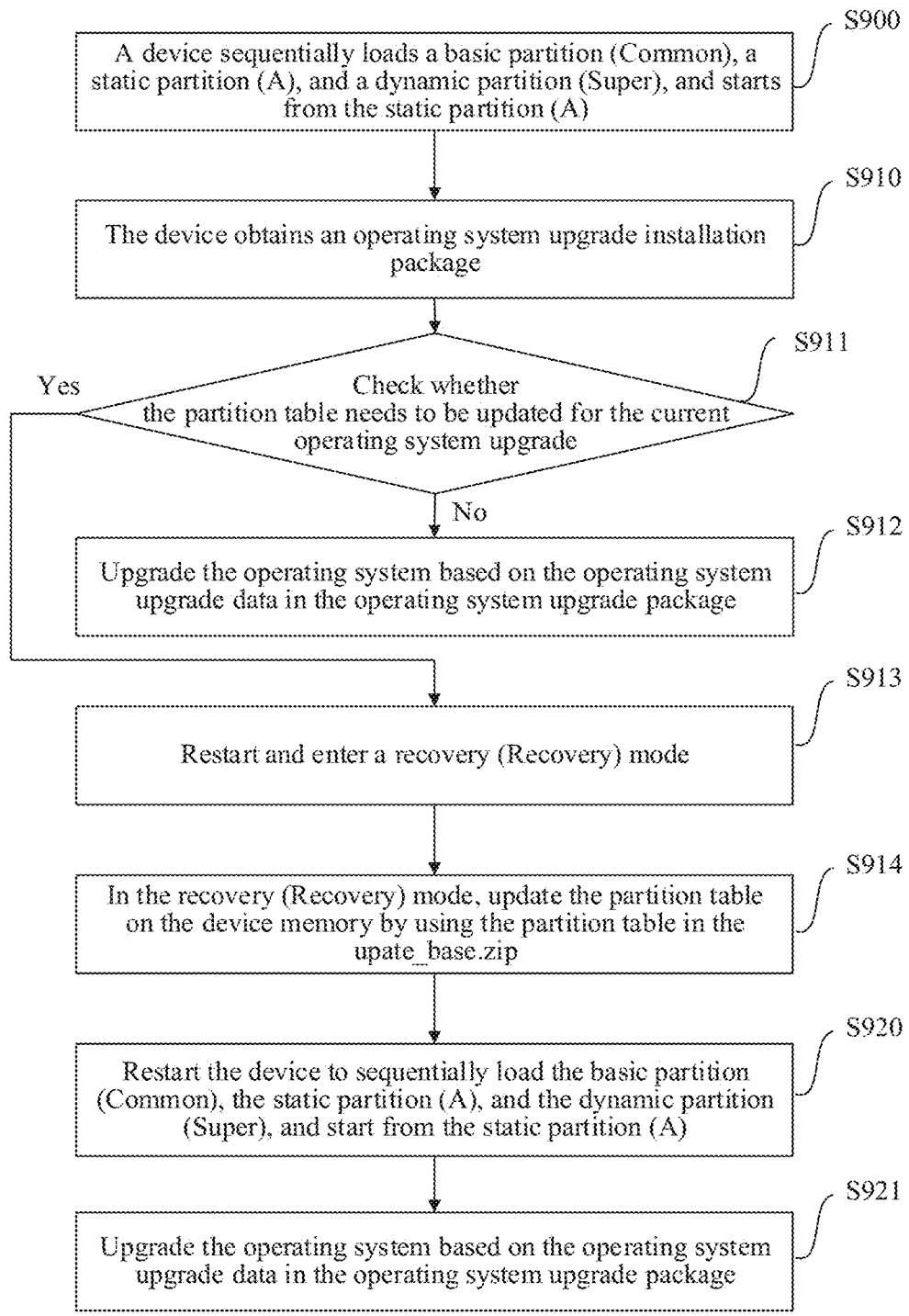
FIG. 9a is a flowchart of upgrading an operating system according to an embodiment of this application.

FIG. 9a is a flowchart of operating system upgrade according to an embodiment of this application. The device performs an operating system upgrade including partition architecture reconfiguration as shown in FIG. 9a.

S900. The device sequentially loads the basic partition (Common), the static partition (A), and the dynamic partition (Super), and starts from the static partition (A).

S910. Obtain an operating system upgrade package. For a process of obtaining the operating system upgrade package, refer to S510.

The operating system upgrade package includes the partition table of the partition structure corresponding to the latest version of the operating system and the operating system upgrade data. For specific content of the operating system upgrade data, refer to content of the operating system upgrade package in the upgrade process shown in FIG. 5.

The partition table included in the operating system upgrade package is the same as the current partition table in the device memory.

For example, it is assumed that a partition structure corresponding to a current operating system (version 1.0) of a device is shown in FIG. 4, and a partition structure corresponding to the latest operating system (version 2.0) is shown in FIG. 7. On the device memory, the current partition structure includes a reserve partition in addition to the partition and the sub-partition shown in FIG. 4. A part of the current partition table of the device is shown in Table 3. A part of the partition table included in the operating system upgrade package is shown in Table 4. In addition, the operating system upgrade data includes data of the sub-partition A of the static partition.

In the operating system upgrade package, the operating system upgrade data is usually packaged as update_base.zip. In S910, when obtaining the operating system upgrade package, the device further obtains a description file (filelist file) for the operating system upgrade package. The filelist file is used to describe related information of the update_base.zip. For example, the filelist file includes an operating system version number and a hash value of the update_base.zip that are targeted by the update_base.zip.

In the operating system upgrade package obtained in S910, the update_base.zip includes a partition table of a partition structure corresponding to the latest version of the operating system.

Specifically, in a process of generating the operating system upgrade package and the filelist file corresponding to the operating system upgrade package, package the partition table image into update_ptable.zip separately (according to the update_base.zip packet type). Sign the update_ptable.zip and then enter it into the update_base.zip. Then, sign it as a whole.

Figure 9B:
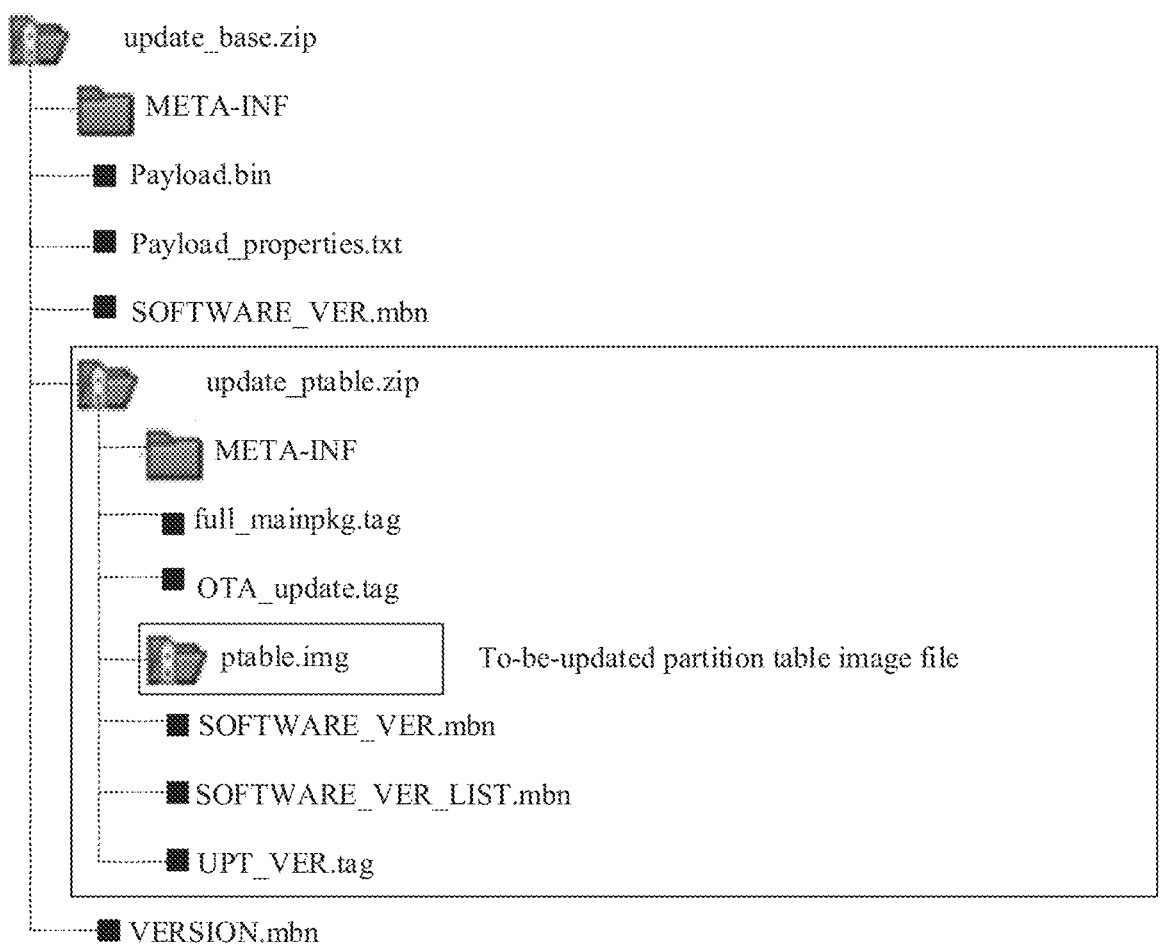
FIG. 9b is a schematic diagram of an internal file composition of an operating system upgrade package according to an embodiment of this application.

FIG. 9b is a schematic diagram of an internal file composition of an operating system upgrade package according to an embodiment of this application. As shown in FIG. 9b, the update_ptable.zip packages a partition table image (update_ptable.zip) in a root directory. In update_ptable.zip, ptable.img is a partition table image file.

Add a partition upgrade package flag to the filelist file of the operating system upgrade package, where the partition upgrade package flag is used to identify that the update_base.zip in the current operating system upgrade package contains the partition table of the latest version.

Further, the operating system upgrade package including the partition table is configured as a key node package. In a process of upgrading an operating system, a cross-version upgrade operation cannot skip the key node package. That is, the device needs to upgrade the operating system (reconfigure the partition structure) based on the key node package before upgrading to a later version of the key node package. For example, the operating system before version 2.0 corresponds to the partition structure shown in FIG. 4. Starting from version 2.0, the operating system corresponds to the partition structure shown in FIG. 7. The operating system upgrade package of the operating system of version 2.0 is the key node package. It is assumed that the current operating system version of the device is 1.0, the latest operating system version is 2.1, and the device cannot be directly upgraded to the operating system version 2.1. Only after the operating system upgrade package based on version 2.0 is upgraded to the operating system version 2.0 (a partition structure shown in FIG. 7 is reconfigured), can the device continue to be upgraded to version 2.1.

S911. Check whether the partition table needs to be updated for the current operating system upgrade. Specifically, it is detected whether the filelist file for the operating system upgrade package includes the partition upgrade package flag obtained in S910.

If the operating system upgrade does not include the partition table, it indicates that the update_base.zip does not include the partition table. In this operating system upgrade, the partition table does not need to be updated, and S912 is performed. The operating system upgrade is performed based on the operating system upgrade data (update_base.zip) in the operating system upgrade package. For execution of S912, refer to S520-S551.

If the filelist file contains the partition upgrade package flag, it indicates that the update_base.zip includes a partition table. In this operating system upgrade, the partition table needs to be updated, to perform S913, restart, and enter the recovery (Recovery) mode.

S914. In the recovery (Recovery) mode, update the partition table on the device memory by using the partition table in the update_base.zip.

S920. Restart the device, load the basic partition (Common), the static partition (A), and the dynamic partition (Super) in sequence, and start the static partition (A).

S921. Perform operating system upgrade based on the operating system upgrade data (update_base.zip) in the operating system upgrade package. For execution of the S921, refer to S520-S551.

According to the method of the embodiment shown in FIG. 9a, an operating system using a virtual A/B upgrade solution may be upgraded and a partition table of a device memory may be updated in an upgrade process. An upgrade solution in this embodiment of this application greatly simplifies operation difficulty of updating a device partition table, and improves user experience. According to the method of the embodiment shown in FIG. 9a, an operating system using a virtual A/B upgrade solution may be upgraded and a partition table of a device memory may be updated in an upgrade process. According to the method in the embodiment shown in FIG. 9a, a device may update a partition table based on a downloaded operating system upgrade package without a need to prepare a burning tool. According to the method in the embodiment shown in FIG. 9, operation difficulty of updating a device partition table is greatly simplified, and user experience is improved.

Specifically, the operation upgrade operation is completed by an operating system update program installed on the device. Specifically, the upgrade package obtaining tool (update apk clent) and the update engine (update engine) are two modules in the operating system. The upgrade package obtaining tool (update apk clent) is configured to obtain an upgrade installation package of an operating system, download and save the operating system upgrade package to a user data partition (Userdata). Refer to S210.

For example, the upgrade package obtaining tool (update apk clent) periodically initiates a package search request to a package search server, where the package search request includes information such as a device current operating system version number (for example, version 1.1), a device SN number, a product model, and a standard (for example, version 1.1). The package searching server retrieves, according to the operating system version number in the package searching request, whether an operating system installation package (for example, version 1.2) with an updated version number exists on the installation package server; and when an operating system installation package of an updated version exists, the package search server feeds back a download address (for example, a URL address) of the operating system upgrade package (for example, an operating system upgrade package upgraded from version 1.1 to version 1.2) to the upgrade package obtaining tool (update apk clent), and a filelist file corresponding to the system upgrade installation package. The upgrade package obtaining tool (update apk clent) downloads the operating system upgrade package from the installation package server according to the download address of the operating system upgrade package.

After the upgrade package obtaining tool (update apk clent) obtains the operating system upgrade package, the update engine (update engine) starts, and the update engine (update engine) performs operating system upgrade according to the operating system upgrade package.

Specifically, after the upgrade package obtaining tool (update apk clent) obtains the operating system upgrade package, the upgrade package obtaining tool (update apk clent) sets a start attribute of the update engine (update engine), and sets the start attribute to true. The service servicemanger in the background of the resident operating system monitors the start attribute of the update engine (update engine) 302. When the servicemanger detects that the start attribute of the update engine (update engine) is true, the servicemanger starts the update engine (update engine).

The upgrade package obtaining tool (update apk clent) obtains the status of the update engine (update engine)

through binder communication. When the upgrade package obtaining tool (update apk clent) determines that the update engine (update engine) is successfully started, the upgrade package obtaining tool (update apk clent) delivers the upgrade parameter (for example, whether the current upgrade operation is a file update operation or a file merge operation) to the update engine (update engine), and triggers the update engine (update engine) to enter the upgrade process. For a specific upgrade process, refer to S520-S551.

Figure 10:
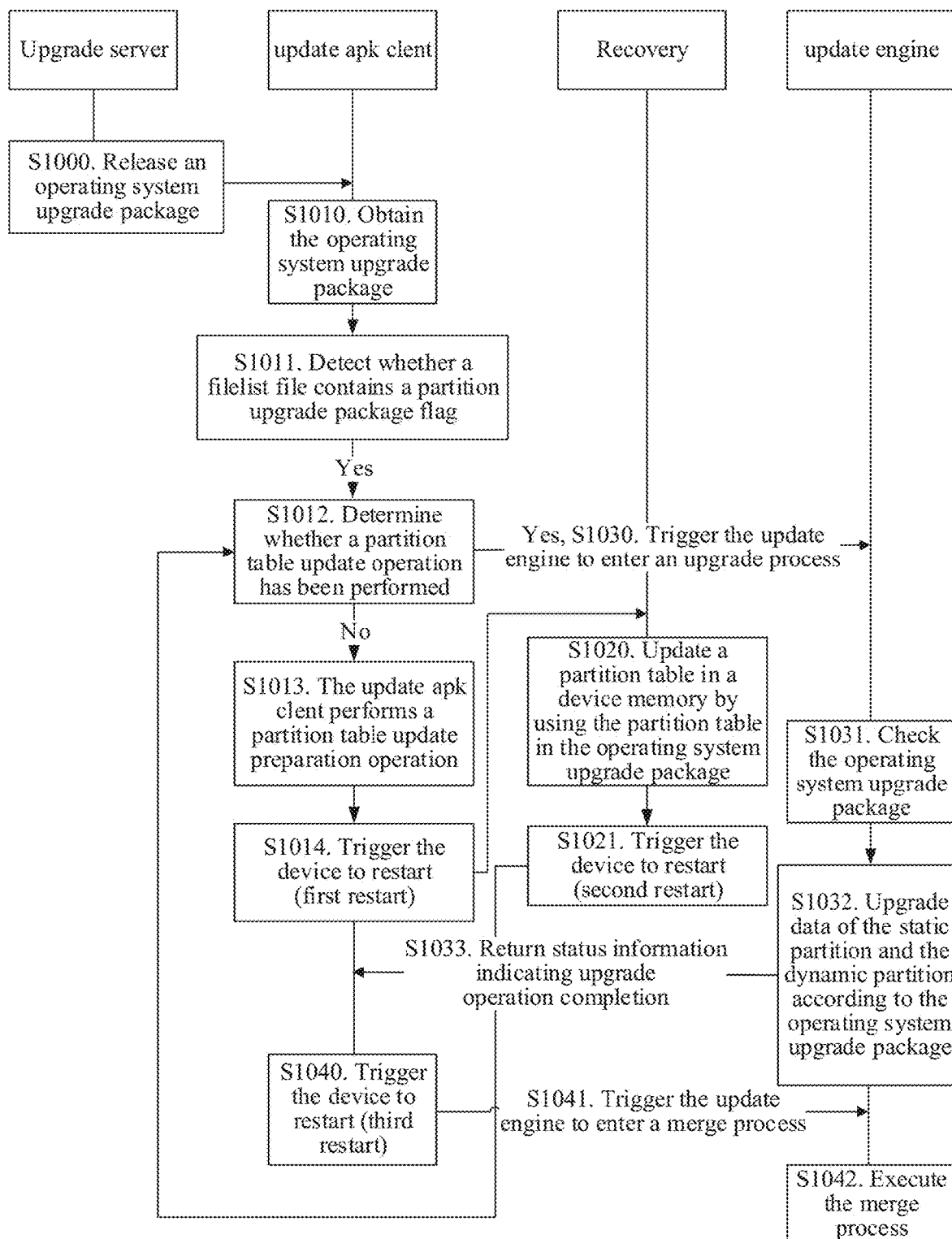
FIG. 10 is a flowchart of upgrading an operating system according to an embodiment of this application.

In an embodiment of this application, S911 is implemented based on the upgrade package obtaining tool (update apk clent). Specifically, FIG. 10 is a flowchart of operating system upgrade according to an embodiment of this application. A device performs an operating system upgrade including partition architecture reconfiguration as shown in FIG. 10.

S1000. An upgrade server pushes a latest version of an operating system upgrade package that is used to update a partition table.

The device sequentially loads the basic partition (Common), the static partition (A), and the dynamic partition (Super), and starts from the static partition (A). S1000 may be performed after the device is started, or may be performed before the device is started. When the device starts from the static partition (A), the update apk clent performs S1010 to obtain the operating system upgrade package. For a process of obtaining the operating system upgrade package, refer to S910.

S1011. The update apk clent detects whether a filelist file of the operating system upgrade package includes a partition upgrade package flag. Refer to S911.

The operating system upgrade package obtained by the update apk clent is an operating system upgrade package used to update a partition table. Therefore, the filelist file of the operating system upgrade package includes the partition upgrade package flag. S1012 is performed, and the update apk clent determines whether the operating system upgrade package has been used to perform an update partition table operation. In the currently performed S1012, the update apk clent determines that the operating system upgrade package has not been used to perform the update partition table operation. Therefore, S1013 is performed, and the update apk clent performs a partition table update preparation operation.

After the update apk clent completes the partition table update preparation operation, S1014 is performed. The update apk clent triggers the device to restart (first restart). The device after restart enters a recovery mode.

S1020. In the Recovery mode, the device updates the partition table in the device memory by using the partition table in the operating system upgrade package.

In the recovery mode, after completing updating of the partition table, the device performs S1021, and triggers the device to restart again (second restart). After the restart, the device sequentially loads the basic partition (Common), the static partition (A), and the dynamic partition (Super), and starts from the static partition (A).

When the device starts from the static partition (A), the update apk clent performs S1012 again to determine whether the operating system upgrade package has been used to perform an update partition table operation. In S1012 that is performed again, the update apk clent determines that an operation of updating a partition table is performed by using the operating system upgrade package. Therefore, the update apk clent performs S1030 to trigger an update engine to enter the upgrade process.

In the upgrade process, the update engine performs S1031 to check the operating system upgrade package. Specifically, it is checked whether a digital signature of the operating system upgrade package is valid, and it is determined whether the operating system upgrade package is a valid upgrade package.

After the operating system upgrade package passes verification, the update engine performs S1032, and upgrades the static partition and the dynamic partition data according to the operating system upgrade package. For details, refer to S520, S530, and S531.

After the update engine completes the upgrade operation of S1032, the update engine performs S1033 and returns status information of the upgrade operation to the update apk clent.

S1040. The update apk clent triggers the device to restart (third restart). For example, the user is prompted to restart immediately or restart later.

After the device restarts, the device loads the basic partition (Common), the static partition (B), and the dynamic partition (Super) in sequence, and starts from the static partition (B). Refer to S540 and S541.

After the device starts from the static partition (B), the update apk clent performs S1041, and the update apk clent triggers the update engine to enter the merge process.

S1042. The update engine performs the merge process. Refer to S551. After the merge process is completed, the operating system of the device is upgraded.

Figure 11:
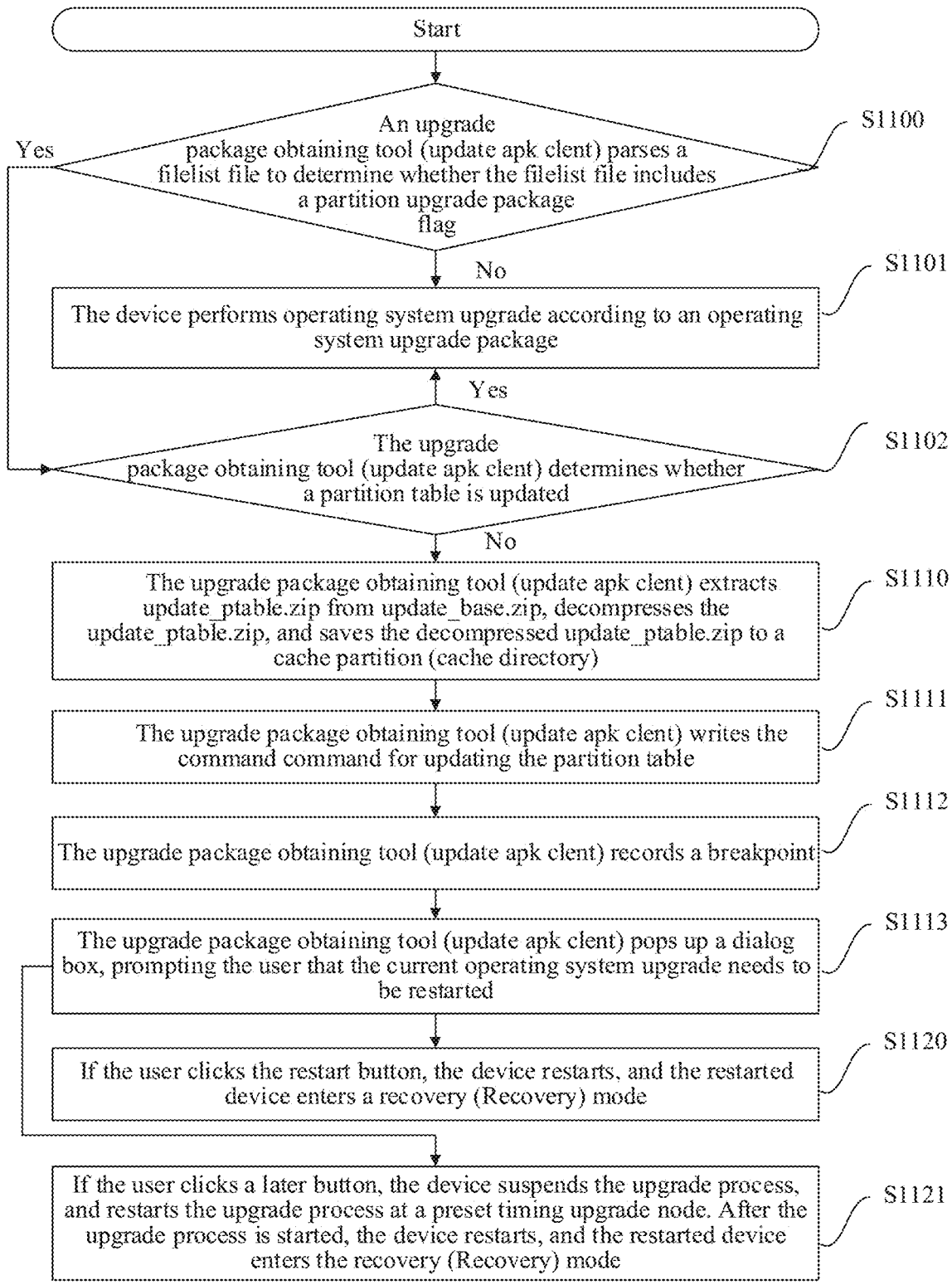
FIG. 11 is a partial flowchart of upgrading an operating system according to an embodiment of this application.

Specifically, FIG. 11 is a partial flowchart of upgrading an operating system according to an embodiment of this application.

In S1010, the upgrade package obtaining tool (update apk clent) obtains the operating system upgrade package and the filelist file. After this, S1011-S1014 perform the following steps as shown in FIG. 11.

S1100. The upgrade package obtaining tool (update apk clent) parses the filelist file to determine whether the filelist file includes the partition upgrade package flag.

For example, if the filelist file does not include the partition upgrade package flag, in S1101, the device performs the operating system upgrade according to the operating system upgrade package. Specifically, the upgrade package obtaining tool (update apk clent) starts the update engine (update engine), and the update engine (update engine) upgrades the static partition (B) and the dynamic partition according to the operating system upgrade package. The device starts from the static partition (B), and the upgrade package obtaining tool (update apk clent) starts the update engine (update engine) to perform a merge operation. Refer to S520-S551.

If the filelist file contains the partition upgrade package flag, in S1102 (that is, S1012), the upgrade package obtaining tool (update apk clent) determines whether the partition table is updated.

Specifically, in S1102, the upgrade package obtaining tool (update apk clent) determines, according to a status of a partition update flag bit (ptable oeminfo) stored in metadata (/metadata) of the common partition, whether the partition table is updated. When ptable oeminfo=0 (the status is not updated), the partition table is not updated: when ptable oeminfo=1 (the status is updated), the partition table is updated: and the initial status of ptable oeminfo is 0 by default.

When the device has not performed an update partition table operation by using the operating system upgrade package, and ptable oeminfo=0, the upgrade package obtaining tool (update apk clent) performs a partition table update preparation operation, where the partition table update preparation operation (that is, S1013) includes S1110-S1111:

S1110. Extract the update_ptable.zip from the update_base.zip, decompress the update_ptable.zip, and save the decompressed update_ptable.zip to a cache partition (cache directory).

S1111. Write a command command (CMD) updated for the partition table. Specifically, the command command is written to the cache partition (cache directory), and the command command is used to instruct the device to execute a process of updating a partition table.

For example, the update_ptable.zip includes a partition table image ptable.img and a hash value H1 of the ptable.img. In SI 111, the command command is written, and the command command includes an execution process identifier (Process1) that points to a process (1).

The process (1) includes the following steps:
Calculate a hash value H2 of ptable.img;
compare H1 and H2;
if they different, report an error and restart the device (the device starts from the static partition (A) by loading the basic partition (Common), the static partition (A), and the dynamic partition (Super) after being restarted);
if they are the same, read the current partition table of the device (assuming that the current partition table of the device is ptable0);
open ptable.img (it is assumed that ptable.img is ptable1 after it is opened);
verify that start and end locations of partition address of partitions whose names are consistent in ptable0 and ptable1 are consistent;
if the start and end locations of the partition address of partitions whose names are consistent in ptable0 and ptable1 are inconsistent, report an error and restart the device (the device starts from the static partition (A) by loading the basic partition (Common), the static partition (A), and the dynamic partition (Super) after being restarted);
if the start and end locations of the partition address of partitions whose names are consistent in ptable0 and ptable1 are consistent, use ptable.img to update the current partition table on the device memory (update ptable0 to ptable1);
configure the ptable oeminfo=1; and
restart the device (the device starts from the static partition (A) by loading the basic partition (Common), the static partition (A), and the dynamic partition (Super) after being restarted).

After S1111, the update apk clent completes the partition table update preparation operation. Then update apk clent performs S1112 to record a breakpoint and record the current upgrade progress of the operating system. After the device restarts to enter the operating system, the operating system upgrade operation starts from S1102.

After S1112, the update apk clent completes the partition table update preparation operation, and the update apk clent triggers the device to restart (first restart). Specifically, the update apk clent performs SI 113 to pop up a dialog box, prompting the user that the current operating system upgrade needs to restart the device.

Specifically, execution of S1010, S1100, S1110, S1111, and S1112 may be performed in a background in a process in which the user normally uses the mobile phone.

Figure 12:
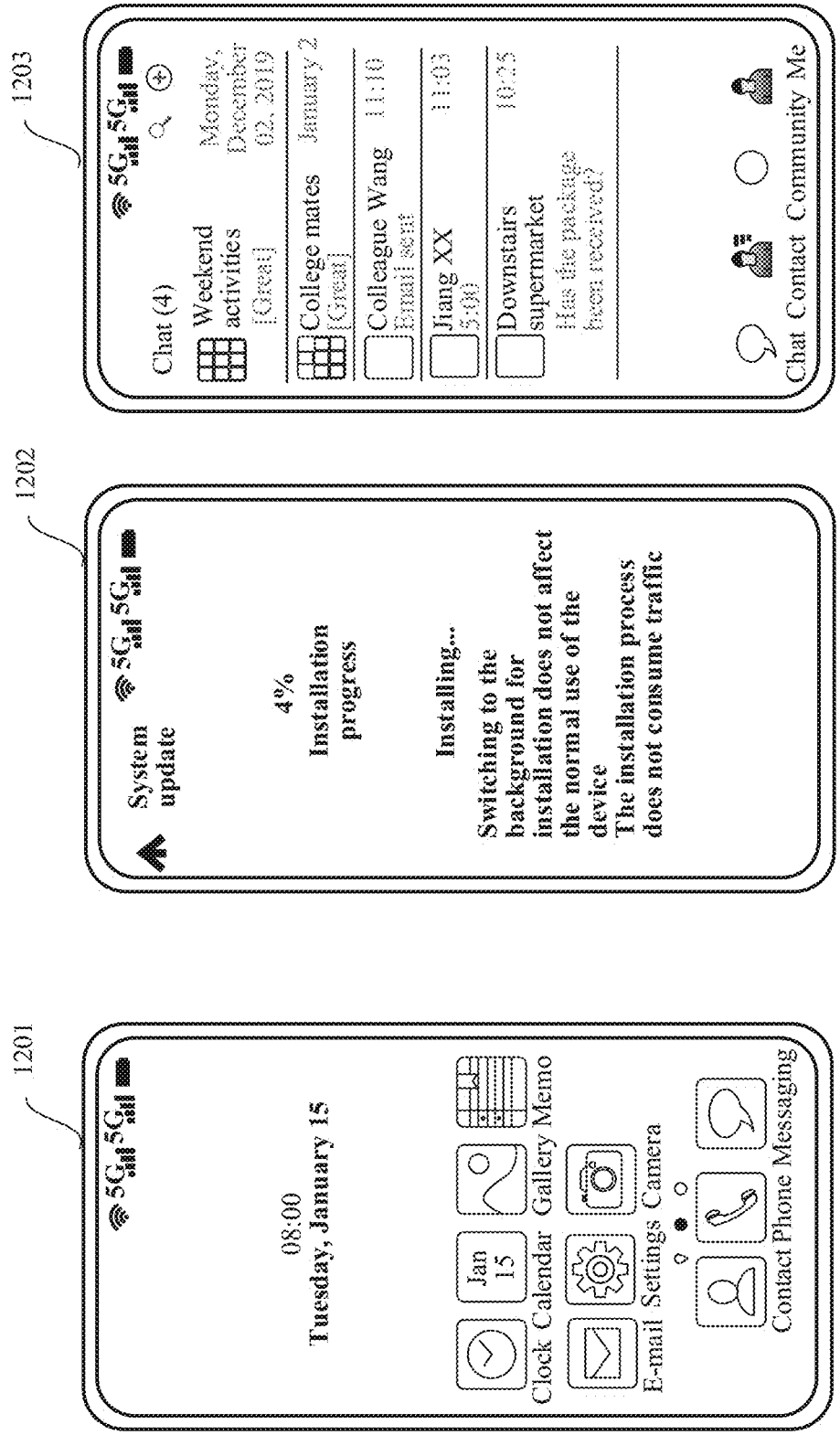
FIG. 12 is a schematic diagram of a mobile phone running interface according to an embodiment of this application.

Specifically, FIG. 12 is a schematic diagram of a mobile phone running interface according to an embodiment of this application. After the mobile phone successfully starts the operating system, the mobile phone enters the system interface shown in 1201 in FIG. 12. The mobile phone performs operating system upgrade (performs S1010, S1100, S1110, S1111, and S1112), and a display interface of the mobile phone may be an interface shown in 1202 in FIG. 12, so as to display operating system upgrade progress to the user. Execution of S1010, S1100, S1110. S1111, and S1112 may also run in the system background. When running the S1010, S1100, S1110, S1111, and S1112 on the mobile phone, the user can switch to the system interface shown in 1201 to open another application. Alternatively, when the mobile phone runs S1010, S1100, S1110, S1111, and S1112, the user may switch to an application interface of another application that is running in the system, for example, a chat application interface shown in 1203.

In S1113, when the mobile phone needs to be restarted, the mobile phone outputs a restart prompt to the user to confirm whether to restart immediately.

Figure 13:
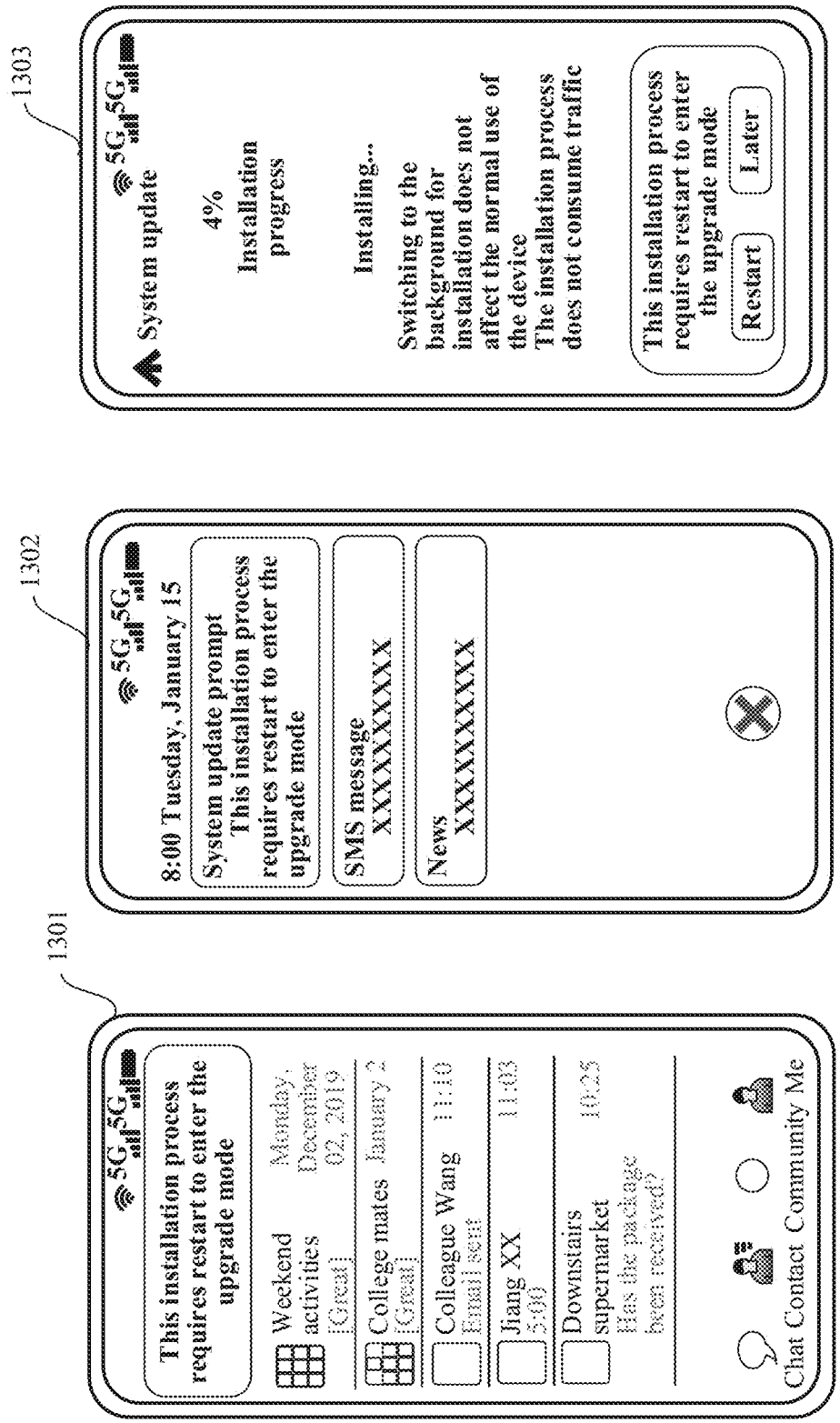
FIG. 13 is a schematic diagram of a mobile phone running interface according to an embodiment of this application.

For example, FIG. 13 is a schematic diagram of a mobile phone running interface according to an embodiment of this application. The mobile phone currently displays the interface shown in FIG. 12 in FIG. 1202, and displays the operating system upgrade progress to the user. In S1113, the mobile phone displays the interface shown in 1303 in FIG. 13, and the user acknowledges to restart immediately or restart later.

In another example, the mobile phone currently displays the interface shown in FIG. 12 in step 1203, and the user uses a chat application. In S1113, the mobile phone displays the interface shown in 1301 in FIG. 13, and a prompt notification is displayed. The user clicks the prompt notification to enter the interface 1303 shown in FIG. 13. The user acknowledges to restart immediately or later. Alternatively, the user opens a pull-down notification bar, and the mobile phone displays the interface shown in 1302 in FIG. 13. In the pull-down notification bar, the user clicks the prompt notification to enter the interface 1303 shown in FIG. 13. The user acknowledges to restart immediately or later.

Specifically, in S1113, if the user clicks the restart button, S1120 (that is, S1014) is perform. The device restarts, and the restarted device enters a recovery (Recovery) mode.

In S1113, if the user clicks a later button, S1121 is performed, and the device suspends the upgrade process, and restarts the upgrade process at a preset timing upgrade node. After the upgrade process is started, the device restarts, and the restarted device enters the recovery (Recovery) mode.

Figure 14:
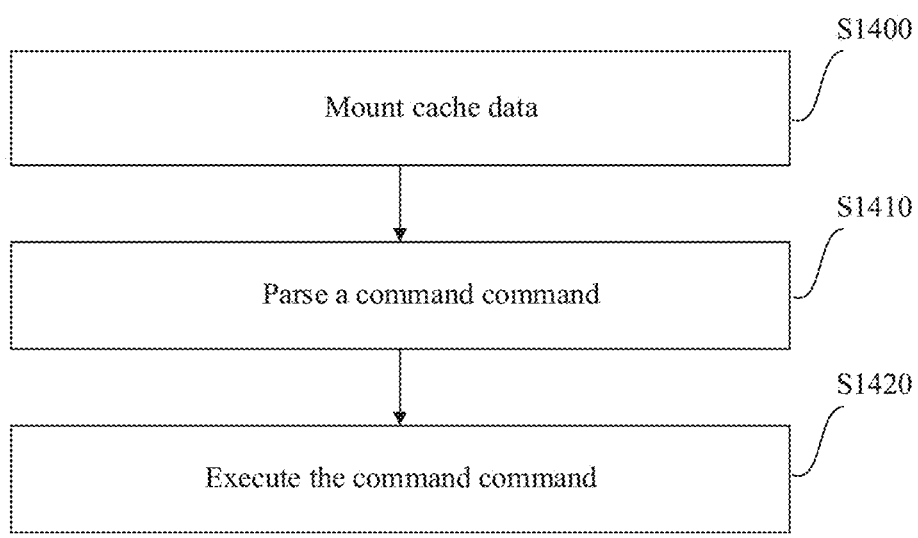
FIG. 14 is a partial flowchart of upgrading an operating system according to an embodiment of this application.

FIG. 14 is a partial flowchart of upgrading an operating system according to an embodiment of this application. After S1120 or S1121, the device restarts to enter the recovery (Recovery) mode, and in the recovery (Recovery) mode, the device executes the process shown in FIG. 14.

Specifically, S1020-S1021 include:
S1400. Mount cache data. Specifically, mount data in a cache directory (update_ptable.zip decompression content and the command command written in S1111).

S1410. Parse the command command. Specifically, parse the command command written in S1111.

S1420. Invoke execution code of the process (1) according to the command command.

For example, the execution process identifier (Process1) pointing to the process (1) in the command command is obtained through parsing. The execution code of the execution process (1) is implemented according to the execution process identifier (Process1) to fetch the pre-stored execution process (process (1)) corresponding to the execution process (process (1)) of the Process1. Specifically, in S1420, the device performs hash value verification on the mounted ptable.img; verifies whether the ptable.img is available after the check succeeds: refreshes the original partition table on the device memory when the ptable.img is available; and restarts the device after the refresh is successful (second restart).

For specific execution of S1420, refer to the description of the process (1) in S1111.

After S1420, the device loads the basic partition (Common), the static partition (A), and the dynamic partition (Super), and starts from the static partition (A). After the operating system is started, the device loads the breakpoint saved in S1112, continues the operating system upgrade operation from S1102, and performs SI 102 again.

S1102. The upgrade package obtaining tool (update apk clent) determines whether the partition table is updated.

Specifically, in S1420, the device executes the process (1) corresponding to the command command written in S1111, and configures the ptable oeminfo=1 after the partition table is successfully updated. Therefore, in S1102 performed again, when the upgrade package obtaining tool (update apk clent) reads that the partition update flag bit (ptable oeminfo) stored in the metadata (/metadata) of the common partition is ptable oeminfo=1, the partition table is updated.

Therefore, after S1102 is performed again. S1101 (that is, S1030) is performed, and the device performs operating system upgrade according to the operating system upgrade package. Refer to S520-S551. Further, in S1101, after the operating system is successfully upgraded, the update engine (update engine) configures the ptable oeminfo=0. Specifically, in S531, the update engine (update engine) is configured with the ptable oeminfo=0.

Figure 15:
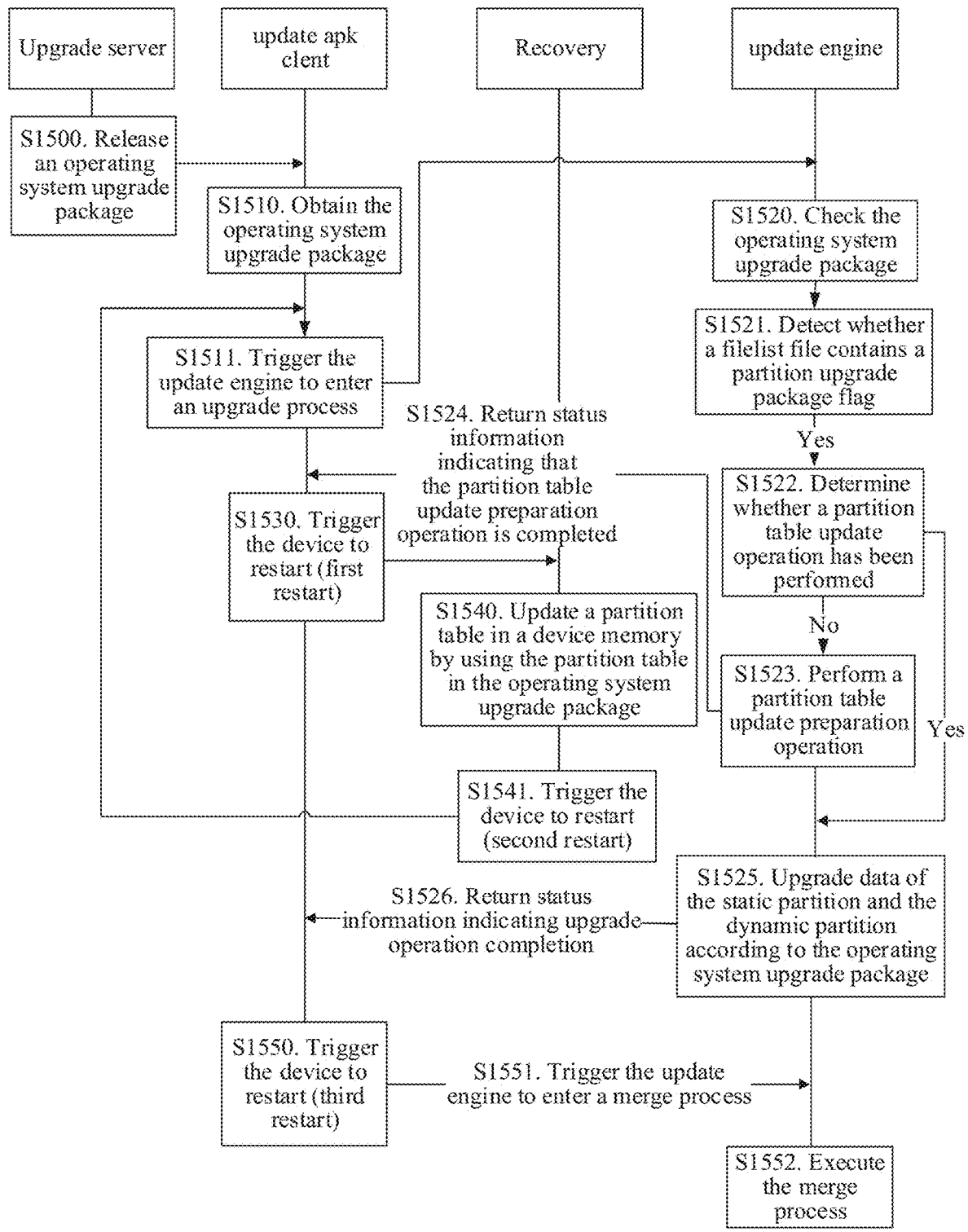
FIG. 15 is a flowchart of upgrading an operating system according to an embodiment of this application.

Further, in another embodiment, S911 is implemented based on an update engine (update engine). Specifically, FIG. 15 is a flowchart of operating system upgrade according to an embodiment of this application. A device performs an operating system upgrade including partition architecture reconfiguration as shown in FIG. 15.

S1500. An upgrade server pushes a latest version of an operating system upgrade package that is used to update a partition table.

The device sequentially loads the basic partition (Common), the static partition (A), and the dynamic partition (Super), and starts from the static partition (A). S1500 may be performed after the device is started, or may be performed before the device is started. When the device starts from the static partition (A), the update apk clent performs S1510 to obtain the operating system upgrade package. For a process of obtaining the operating system upgrade package, refer to S910.

S1511. The update apk clent triggers the update engine to enter the upgrade process. In the upgrade process, the update engine performs S1520 to check the operating system upgrade package. Specifically, it is checked whether a digital signature of the operating system upgrade package is valid, and it is determined whether the operating system upgrade package is a valid upgrade package.

After the operating system upgrade package passes verification, the update engine performs S1521 to detect whether the filelist file for the operating system upgrade package includes the partition upgrade package flag. Refer to S911.

The operating system upgrade package obtained by the update apk clent is an operating system upgrade package used to update a partition table. Therefore, the filelist file of the operating system upgrade package includes the partition upgrade package flag. S1522 is performed, and the update engine determines whether the operating system upgrade package has been used to perform an update partition table operation. In the currently performed S1522, the update engine determines that the operating system upgrade package has not been used to perform the update partition table operation. Therefore, S1523 is performed, and the update engine performs a partition table update preparation operation.

After the update engine completes the partition table update preparation operation, the update engine performs S1524 and returns the status information of the partition table update preparation operation to the update apk clent.

After the update apk clent acknowledges that the update engine completes the partition table update preparation operation, the update apk clent performs S1530, triggers the device to restart (first restart), and the restarted device enters the recovery mode.

S1540. In the Recovery mode, the device updates the partition table in the device memory by using the partition table in the operating system upgrade package. Refer to S1020.

In the recovery mode, after completing updating of the partition table, the device performs S1541, and triggers the device to restart again (second restart). After the restart, the device sequentially loads the basic partition (Common), the static partition (A), and the dynamic partition (Super), and starts from the static partition (A).

When the device starts from the static partition (A), the update apk clent performs S1511 again, and triggers the update engine to enter the upgrade process. The update engine performs S1520 again to check the operating system upgrade package.

After the operating system upgrade package passes verification, the update engine performs S1521 again to detect whether the filelist file for the operating system upgrade package includes the partition upgrade package flag.

The update engine performs S1522 again and determines whether the operating system upgrade package has been used to perform an update partition table operation. In the currently performed S1522, the update engine determines that the operating system upgrade package has been used to perform the update partition table operation. Therefore, the update engine performs S1525, and upgrades the static partition and the dynamic partition data according to the operating system upgrade package. For details, refer to S520, S530, and S531.

After the update engine completes the upgrade operation of S1525, the update engine performs S1526 and returns status information of the upgrade operation to the update apk clent.

S1550. The update apk clent triggers the device to restart (third restart). For example, the user is prompted to restart immediately or restart later.

After the device restarts, the device loads the basic partition (Common), the static partition (B), and the dynamic partition (Super) in sequence, and starts from the static partition (B). Refer to S540 and S541.

After the device starts from the static partition (B), the update apk clent performs S1551, and the update apk clent triggers the update engine to enter the merge process.

S1552. The update engine performs the merge process. Refer to S551. After the merge process is completed, the operating system of the device is upgraded.

Figure 16:
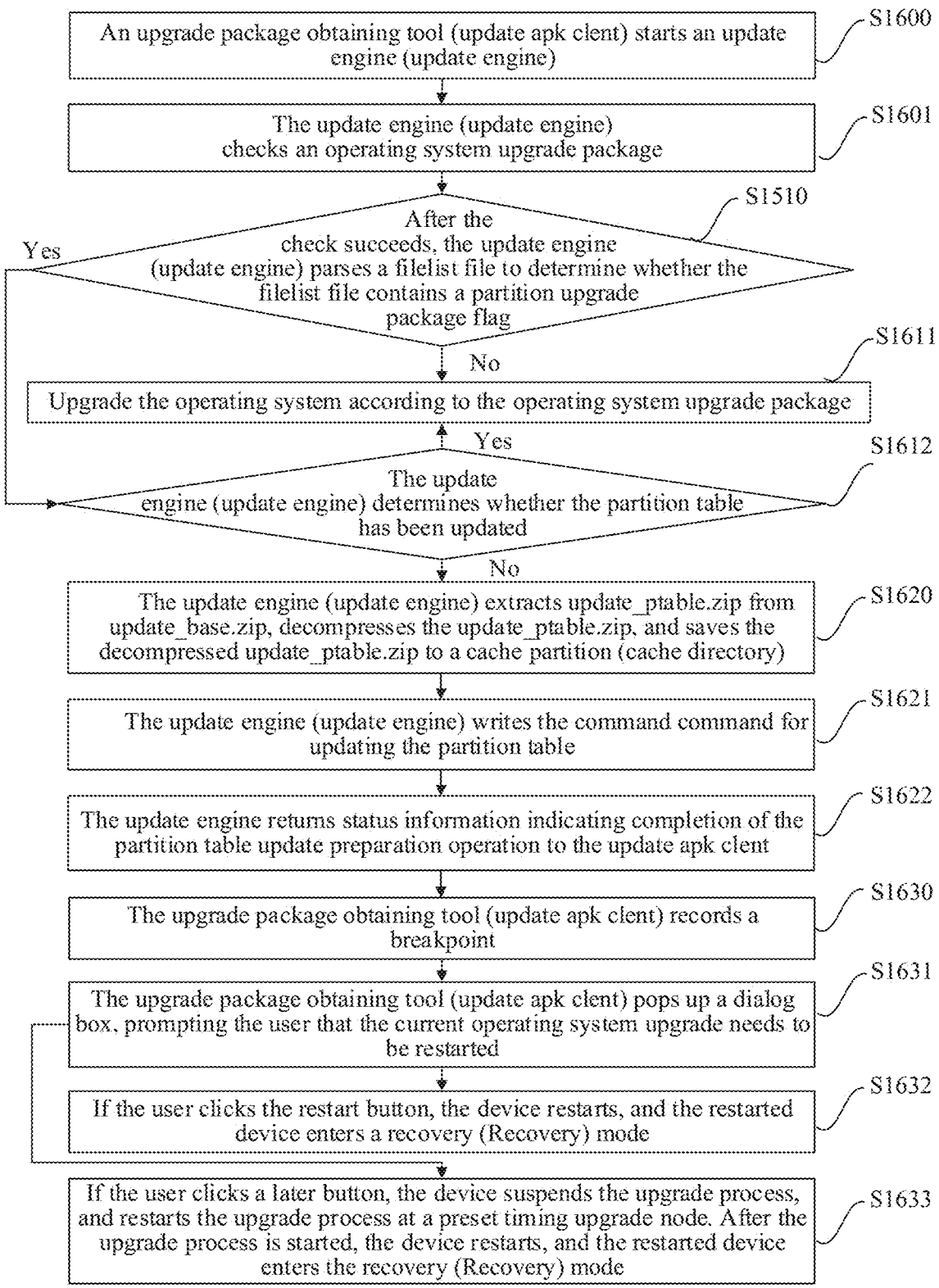
FIG. 16 is a partial flowchart of upgrading an operating system according to an embodiment of this application.

Specifically, FIG. 16 is a partial flowchart of upgrading an operating system according to an embodiment of this application.

In S1510, the upgrade package obtaining tool (update apk clent) obtains the operating system upgrade package and the filelist file. After this, the device performs the following steps shown in FIG. 16 to implement S1511-S1530.

S1600. The upgrade package obtaining tool (update apk clent) starts the update engine (update engine).

S1601. The update engine (update engine) checks the operating system upgrade package.

After the check succeeds, the update engine (update engine) performs S1610 to parse the filelist file to determine whether the filelist file contains the partition upgrade package flag.

If the filelist file does not contain the partition upgrade package flag, perform S1611 command to upgrade the operating system according to the operating system upgrade package. Specifically, the update engine upgrades the static partition and the dynamic partition data according to the operating system upgrade package. For details, refer to S520. S530, and S531. The update apk clent triggers the device to restart. After the device restarts, the device loads the basic partition (Common), the static partition (B), and the dynamic partition (Super) in sequence, and starts from the static partition (B). After the device starts the static partition (B), the update apk clent triggers the update engine to enter the merge process. The update engine executes the merge process. After the merge process is completed, the operating system of the device is upgraded. Refer to S520-S551.

If the filelist file includes the partition upgrade package flag, the update engine (update engine) performs S1612, and the update engine (update engine) determines whether the partition table is updated. Referring to S1102, ptable oeminfo=0, the update engine (update engine) performs a partition table update preparation operation. The partition table update preparation operation includes:

S1620. Extract the update_ptable.zip from the update_base.zip, decompress the update_ptable.zip, and save the decompressed update_ptable.zip to a cache partition (cache directory).

S1621. Write a command command (CMD) updated for the partition table. Refer to S1111.

After the partition table update preparation operation is completed, the update engine performs S1622, and returns the status information of completion of the partition table update preparation operation to the update apk clent.

After the update apk clent acknowledges that the update engine completes the partition table update preparation operation, the update apk clent performs S1630 to record a breakpoint and record the current upgrade progress of the operating system. After the device restarts to enter the operating system, the operating system upgrade operation starts from S1600.

For S1631, S1632, and S1633, refer to S1113, S1120, and S1121.

After S1632 or S1633, the device restarts to enter the recovery (Recovery) mode, and in the recovery (Recovery) mode, the device executes the process shown in FIG. 14: S1400-S1420.

After the device is restarted in the recovery mode, the device loads the basic partition (Common), the static partition (A), and the dynamic partition (Super), and starts from the static partition (A). After the operating system is started, the device loads the breakpoint saved in S1630 to continue the operating system upgrade operation. As shown in FIG. 15, an operating system upgrade operation starts from S1600 to execute a subsequent process again. In S1610, the update engine (update engine) parses the filelist file, and determines that the filelist file includes a partition upgrade package flag.

In the recovery (Recovery) mode, the device executes the process (1) corresponding to the command command written in S1621, and configures the ptable oeminfo=1 after the partition table is successfully updated. Therefore, in the re-performed S1612, when the update engine (update engine) reads that the partition update flag bit (ptable oeminfo) stored in the metadata (/metadata) of the common partition is ptable oeminfo=1, the partition table is updated.

Therefore, after S1612 is performed again, S1611 is performed, and operating system upgrade is performed according to the operating system upgrade package.

Further, in S1611, after the operating system is successfully upgraded, the update engine (update engine) configures the ptable oeminfo=0. Refer to S1101.

It is to be understood that some or all steps or operations in the foregoing embodiments are only examples, and other operations or variations thereof may further be performed in the embodiments of this application. In addition, the steps may be performed in an order different from that presented in the foregoing embodiments, and the operations in the foregoing embodiments may not necessarily be all performed.

Further, generally, improvements to a technology can be clearly distinguished as improvements in hardware (e.g. improvements to circuit structures such as diodes, transistors, switches, etc.) or software (improvements to method processes). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) (for example, a field programmable gate array (FPGA)) is a type of an integrated circuit whose logic function is determined by a visitor by programming the device. Designers program a digital device "integrated" on a PLD instead of requiring chip manufacturers to design and make dedicated integrated circuit chips. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

Therefore, the method process provided in this embodiment of this application may be implemented in a hardware manner. For example, a controller is used to control a touchscreen to implement the method process provided in this embodiment of this application.

The controller may be implemented in any suitable manner. For example, the controller may take the form of a computer-readable medium, a logic gate, a switch, an application specific integrated circuit (Application Specific Integrated Circuit, ASIC), a programmable logic controller, and an embedded microcontroller that store computer-readable program code (such as software or firmware) executable by a microprocessor or a processor. Examples of the controller include but are not limited to the following microcontrollers: ARC 625D, Atmel AT91SAM, Microchip PIC18F26K20, and Silicone Labs C8051F320. The memory controller may also be implemented as part of the control logic of the memory. A person skilled in the art also appreciates that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component, and apparatuses included therein for implementing various functions can also be considered as structures inside the hardware component. Alternatively, apparatuses configured to implement various functions can be considered as both software modules implementing the method and structures inside the hardware component.

Corresponding to the foregoing embodiment, this application further provides an electronic device. The electronic device includes a memory configured to store a computer program instruction and a processor configured to execute the program instruction. When the computer program instruction is executed by the processor, the electronic device is triggered to perform the method steps described in the embodiments of this application.

This application further provides a computer program product. The computer program product includes a computer program. When the computer program product runs on a computer, the computer performs some or all steps provided in the embodiments of this application.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present invention.

For same or similar parts in the embodiments in this specification, reference may be made to these embodiments. Especially, an apparatus embodiment and a terminal embodiment are basically similar to a method embodiment, and therefore is described briefly; for related parts, refer to descriptions in the method embodiment.

What is claimed is:

1. A method, applied to an electronic device that comprises a processor and a memory, wherein the memory comprises a basic partition, a first static partition, a second static partition, a dynamic partition, and a user data partition, wherein a current partition table of the electronic device is a first partition table corresponding to a first operating system, wherein data of the basic partition, the first static partition, and the dynamic partition are loaded after the electronic device is started, so as to run the first operating system, and wherein after the first operating system runs, the method comprises:

obtaining an operating system upgrade package that comprises a second partition table corresponding to a second operating system and operating system upgrade data, wherein the operating system upgrade data is configured to upgrade the first operating system to the second operating system, and address configurations of partitions with a same name are consistent in the second partition table and the first partition table;

triggering a first restart of the electronic device in response to obtaining the operating system upgrade package, wherein after the first restart, the electronic device enters a recovery mode;

updating the partition table of the electronic device to the second partition table in the recovery mode;

triggering a second restart of the electronic device in response to updating the partition table of the electronic device to the second partition table, wherein after the second restart, the electronic device loads the data of the basic partition, the first static partition, and the dynamic partition, to run the first operating system; and upgrading the first operating system of the electronic device according to the operating system upgrade data, and upgrading the first operating system to the second operating system.

2. The method of claim 1, wherein before the electronic device is restarted to enter the recovery mode, the method further comprises performing a partition table update preparation operation, wherein the partition table update preparation operation configures an execution process of the electronic device in the recovery mode.

3. The method of claim 2, wherein performing the partition table update preparation operation comprises:

saving the second partition table to a cache; and writing a first control command into the cache, wherein the first control command corresponds to a first operation process that updates the partition table of the electronic device to the second partition table.

4. The method of claim 3, wherein the first operation process comprises:

verifying the second partition table;

verifying, after the second partition table is verified successfully, whether the address configurations of the partitions with the same name are consistent in the second partition table and the first partition table; and updating the partition table of the electronic device based on the second partition table when the address configurations of the partitions with the same name are consistent in the second partition table and the first partition table.

5. The method of claim 3, wherein updating the partition table of the electronic device to the second partition table in the recovery mode comprises:

loading the second partition table and the first control command in the cache;

parsing the first control command, and invoking execution code of the first operation process according to the first control command; and executing the execution code of the first operation process.

6. The method of claim 2, wherein before performing the partition table update preparation operation, the method further comprises:

determining whether the operating system upgrade package has been used to update a partition;

determining whether the partition table of the electronic device has been updated based on the second partition table when the operating system upgrade package has been used to update the partition; and performing the partition table update preparation operation when the partition table of the electronic device has not been updated based on the second partition table.

7. The method of claim 6, wherein determining whether the operating system upgrade package has been used to update the partition comprises parsing a description file corresponding to the operating system upgrade package, wherein when the description file comprises a partition upgrade package flag, the operating system upgrade package has been used to update the partition.

8. The method of claim 6, wherein determining whether the partition table of the electronic device has been updated based on the second partition table comprises determining, according to a status of a partition update flag bit, whether the partition table of the electronic device has been updated based on the second partition table, wherein the status of the partition update flag bit is not updated before obtaining the operating system upgrade package, wherein updating the partition table of the electronic device to the second partition table in the recovery mode comprises setting the status of the partition update flag bit to updated, and wherein upgrading the operating system of the electronic device according to the operating system upgrade data, and upgrading the first operating system to the second operating system comprises setting the status of the partition update flag bit to not updated.

9. The method of claim 8, wherein before upgrading the operating system of the electronic device according to the operating system upgrade data, the method further comprises:

re-determining, after the second restart, and after the first operating system runs, whether the partition table of the electronic device has been updated based on the second partition table; and upgrading the operating system of the electronic device according to the operating system upgrade data when it is determined that the partition table of the electronic device has been updated based on the second partition table.

10. The method of claim 9, wherein the first operating system comprises a first upgrade package obtaining tool and a first update engine, and after the first operating system runs, the method comprises:

obtaining, by the first upgrade package obtaining tool, the operating system upgrade package;

determining, by the first upgrade package obtaining tool, whether the operating system upgrade package has been used to update the partition;

determining, by the first upgrade package obtaining tool when the operating system upgrade package has been used to update the partition, whether the partition table of the electronic device has been updated based on the second partition table;

performing, by the first upgrade package obtaining tool when the partition table of the electronic device has not been updated based on the second partition table, the partition table update preparation operation;

recording, by the first upgrade package obtaining tool, a first upgrade process breakpoint that corresponds to determining whether the partition table of the electronic device has been updated based on the second partition table;

triggering, by the first upgrade package obtaining tool, the first restart;

entering, by the electronic device after the first restart, the recovery mode, wherein in the recovery mode, the partition table of the electronic device has been updated to the second partition table, and then the partition table of the electronic device has been updated based on the second partition table;

triggering the second restart in the recovery mode;

loading, by the electronic device after the second restart, the data of the basic partition, the first static partition, and the dynamic partition to run the first operating system;

reading, by the first upgrade package obtaining tool after the first operating system runs, the first upgrade process breakpoint, and re-determining whether the partition table of the electronic device has been updated based on the second partition table; and triggering, by the first upgrade package obtaining tool when the first upgrade package obtaining tool determines that the partition table of the electronic device has been updated based on the second partition table, the first update engine to upgrade the operating system of the electronic device according to the operating system upgrade data.

11. The method of claim 9, wherein the first operating system comprises a second upgrade package obtaining tool and a second update engine, and after the first operating system runs, the method comprises:

obtaining, by the second upgrade package obtaining tool, the operating system upgrade package;

triggering, by the second upgrade package obtaining tool, the second update engine to enter an upgrade process;

determining, by the second update engine, whether the operating system upgrade package has been used to update the partition;

determining, by the second update engine when the operating system upgrade package has been used to update the partition, whether the partition table of the electronic device has been updated based on the second partition table;

executing, by the second update engine when the partition table of the electronic device has not been updated based on the second partition table, the partition table update preparation operation;

returning, by the second update engine, status information indicating that the partition table update preparation operation is completed to the second upgrade package obtaining tool;

recording, by the second upgrade package obtaining tool, a second upgrade process breakpoint that is configured to trigger the second update engine to enter the upgrade process;

triggering, by the second upgrade package obtaining tool, a third restart of the electronic device;

entering, by the electronic device after the third restart, the recovery mode, wherein in the recovery mode, the partition table of the electronic device is updated to the second partition table, and then the partition table of the electronic device has been updated based on the second partition table;

triggering a fourth restart of the electronic device in the recovery mode;

loading, by the electronic device after the fourth restart, the data of the basic partition, the first static partition, and the dynamic partition to run the first operating system;

reading, by the second upgrade package obtaining tool after the first operating system runs, the second upgrade process breakpoint, and triggering the second update engine to enter the upgrade process again;

re-determining, by the second update engine, whether the operating system upgrade package has been used to update the partition;

re-determining, by the second update engine when the operating system upgrade package has been used to update the partition, whether the partition table of the electronic device has been updated based on the second partition table; and upgrading, by the second update engine when the partition table of the electronic device has not been updated based on the second partition table, the operating system of the electronic device according to the operating system upgrade data.

12. The method of claim 1, wherein the operating system upgrade data further comprises static partition upgrade data and dynamic partition upgrade data, and upgrading the operating system of the electronic device according to the operating system upgrade data comprises:

upgrading data of the second static partition based on the static partition upgrade data;

creating a virtual dynamic partition in the user data partition, and writing the dynamic partition upgrade data to the virtual dynamic partition;

modifying a start sequence of the electronic device from starting from the first static partition to starting from the second static partition;

triggering a third restart of the electronic device;

loading, by the electronic device after the third restart, the data of the basic partition, the second static partition, the dynamic partition, and the virtual dynamic partition to run the second operating system; and merging the data of the virtual dynamic partition to the dynamic partition after the second operating system runs.

13. An electronic device, comprising:

a processor; and a memory coupled to the processor, wherein the memory comprises a basic partition, a first static partition, a second static partition, a dynamic partition, and a user data partition, wherein the dynamic partition comprises a plurality of sub-partitions, and wherein a current partition table of the electronic device is a first partition table corresponding to a first operating system, wherein the processor is configured to execute software code stored in the memory, so that after the electronic device is started, data of the basic partition, the first static partition, and the dynamic partition is loaded to run the first operating system, and wherein after the first operating system runs, the processor is configured to execute software code stored in the memory that causes the electronic device to be configured to:

obtain an operating system upgrade package that comprises a second partition table corresponding to a second operating system and operating system upgrade data, wherein the operating system upgrade data is configured to upgrade the first operating system to the second operating system, and address configurations of partitions with a same name are consistent in the second partition table and the first partition table;

trigger a first restart of the electronic device in response to obtaining the operating system upgrade package, wherein after the first restart, the electronic device enters a recovery mode;

update the partition table of the electronic device to the second partition table in the recovery mode;

trigger a second restart of the electronic device in response to updating the partition table to the second partition table, wherein after the second restart, the electronic device loads the data of the basic partition, the first static partition, and the dynamic partition, to run the first operating system; and upgrade the operating system of the electronic device according to the operating system upgrade data, and upgrading the first operating system to the second operating system.

14. The electronic device of claim 13, wherein before the electronic device is restarted to enter the recovery mode, the processor is configured to execute software code stored in the memory that causes the electronic device to be configured to perform a partition table update preparation operation, wherein the partition table update preparation operation configures an execution process of the electronic device in the recovery mode.

15. The electronic device of claim 14, wherein performing the partition table update preparation operation comprises:

saving the second partition table to a cache; and writing a first control command into the cache, wherein the first control command corresponds to a first operation process that updates the partition table of the electronic device to the second partition table.

16. The electronic device of claim 15, wherein the first operation process comprises:

verifying the second partition table;

verifying, after the second partition table is verified successfully, whether the address configurations of the partitions with the same name are consistent in the second partition table and the first partition table; and updating the partition table of the electronic device based on the second partition table when the address configurations of the partitions with the same name are consistent in the second partition table and the first partition table.

17. The electronic device of claim 15, wherein updating the partition table of the electronic device to the second partition table in the recovery mode comprises:

loading the second partition table and the first control command in the cache;

parsing the first control command, and invoking execution code of the first operation process according to the first control command; and executing the execution code of the first operation process.

18. The electronic device of claim 14, wherein before performing the partition table update preparation operation, the electronic device is further configured to:

determine whether the operating system upgrade package has been used to update a partition;

determine whether the partition table of the electronic device has been updated based on the second partition table when the operating system upgrade package has been used to update the partition; and perform the partition table update preparation operation when the partition table of the electronic device has not been updated based on the second partition table.

19. The electronic device of claim 18, wherein determining whether the operating system upgrade package has been used to update the partition comprises parsing a description file corresponding to the operating system upgrade package, wherein when the description file comprises a partition upgrade package flag, the operating system upgrade package has been used to update the partition.

20. A non-transitory computer-readable storage medium storing instructions that are executable by a processor of an electronic device, wherein a memory of the electronic device comprises a basic partition, a first static partition, a second static partition, a dynamic partition, and a user data partition, wherein a current partition table of the electronic device is a first partition table corresponding to a first operating system, wherein data of the basic partition, the first static partition, and the dynamic partition are loaded after the electronic device is started, so as to run the first operating system, and wherein the instructions, when executed by the processor after the first operating system runs, cause the electronic device to be configured to:

obtain an operating system upgrade package that comprises a second partition table corresponding to a second operating system and operating system upgrade data, wherein the operating system upgrade data is configured to upgrade the first operating system to the second operating system, and address configurations of partitions with a same name are consistent in the second partition table and the first partition table;

trigger a first restart of the electronic device in response to obtaining the operating system upgrade package, wherein after the first restart, the electronic device enters a recovery mode;

update the partition table of the electronic device to the second partition table in the recovery mode;

trigger a second restart of the electronic device in response to updating the partition table to the second partition table, wherein after the second restart, the electronic device loads the data of the basic partition, the first static partition, and the dynamic partition, to run the first operating system; and upgrade the operating system of the electronic device according to the operating system upgrade data, and upgrading the first operating system to the second operating system.

\* \* \* \* \*